(12) United States Patent
Wakui et al.

(10) Patent No.: US 12,463,504 B2
(45) Date of Patent: Nov. 4, 2025

(54) DRIVE UNIT HAVING A BUFFER CHAMBER THAT SEPARATES A MOTOR CHAMBER FROM A STORAGE PORTION

(71) Applicant: HONDA MOTOR CO., LTD., Tokyo (JP)

(72) Inventors: Takashi Wakui, Saitama (JP); Shinji Kato, Saitama (JP); Masaru Sora, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/794,382

(22) Filed: Aug. 5, 2024

(65) Prior Publication Data
US 2025/0055349 A1    Feb. 13, 2025

(51) Int. Cl.
*H02K 9/19* (2006.01)
*H02K 11/30* (2016.01)

(52) U.S. Cl.
CPC .............. *H02K 9/19* (2013.01); *H02K 11/30* (2016.01)

(58) Field of Classification Search
CPC .......... H02K 9/19; H02K 11/30; F16H 57/04; F16H 57/0423
See application file for complete search history.

(56) References Cited

U.S. PATENT DOCUMENTS

| | | | |
|---|---|---|---|
| 2023/0117537 A1* | 4/2023 | Hirano | F04D 29/582 417/423.1 |
| 2024/0030774 A1* | 1/2024 | Chapanar | H02K 9/197 |
| 2024/0100936 A1* | 3/2024 | Trudel | B60K 11/02 |

FOREIGN PATENT DOCUMENTS

JP    2021-151112 A    9/2021

* cited by examiner

*Primary Examiner* — Edwin A Young
(74) *Attorney, Agent, or Firm* — Paratus Law Group, PLLC

(57) ABSTRACT

A drive unit includes a drive motor, a drive unit case having a motor chamber in which the drive motor is accommodated, a heat exchanger which cools a cooling fluid for cooling the drive motor, and a storage portion which stores the cooling fluid. The drive unit case is formed with a buffer chamber separated from the motor chamber and adjacent to the motor chamber. The buffer chamber is divided from the motor chamber by a dividing wall. The storage portion is provided at a position isolated from the motor chamber with the buffer chamber interposed therebetween.

8 Claims, 19 Drawing Sheets

DRIVE UNIT HAVING A BUFFER CHAMBER THAT SEPARATES A MOTOR CHAMBER FROM A STORAGE PORTION

CROSS-REFERENCE TO RELATED APPLICATIONS

This application is based on and claims priority under 35 USC 119 from Japanese Patent Application No. 2023-128804 filed on Aug. 7, 2023, the entire content of which is incorporated herein by reference.

TECHNICAL FIELD

The present disclosure relates to a drive unit to be mounted on an electric vehicle or the like.

BACKGROUND ART

In recent years, efforts to realize a low carbon social or a decarburized social have been activated, and research and development have been performed on an electrification technique in order to reduce $CO_2$ emissions and improve energy efficiency even in vehicles.

In an electrification technique for vehicles, to have higher degree of freedom for mounting to a vehicle, a drive unit is required to be downsized, and is particularly required to be reduced in size in the height direction. In addition, to improve the electricity consumption and the cruising distance, a drive unit is required to transmit power efficiently.

For example, JP2021-151112A describes a drive unit in which an oil storage portion for storing cooling oil for cooling a drive motor is provided below a motor chamber accommodating a drive motor.

However, in the drive unit described in JP2021-151112A, since the oil storage portion is provided adjacent to the motor chamber, heat generated in the motor chamber is transferred to the oil storage portion, and the heat generated in the motor chamber raises the temperature of the oil stored in the oil storage portion.

SUMMARY OF INVENTION

The present disclosure provides a drive unit capable of limiting heat generated in a motor chamber from being transferred to a storage portion.

An aspect of the present disclosure relates to a drive unit including:
  a drive motor;
  a drive unit case having a motor chamber in which the drive motor is accommodated;
  a heat exchanger configured to cool a cooling fluid for cooling the drive motor; and
  a storage portion configured to store the cooling fluid, in which the drive unit case is formed with a buffer chamber separated from the motor chamber and adjacent to the motor chamber, the buffer chamber being divided from the motor chamber by a dividing wall, and the storage portion is provided at a position isolated from the motor chamber with the buffer chamber interposed therebetween.

According to the present disclosure, by isolating the storage portion from the motor chamber and interposing the buffer chamber between the storage portion and the motor chamber, it is possible to prevent heat generated in the motor chamber from being transferred to the storage portion.

BRIEF DESCRIPTION OF DRAWINGS

Exemplary embodiment(s) of the present invention will be described in detail based on the following figures, wherein.

DESCRIPTION OF EMBODIMENTS

Figure 1:
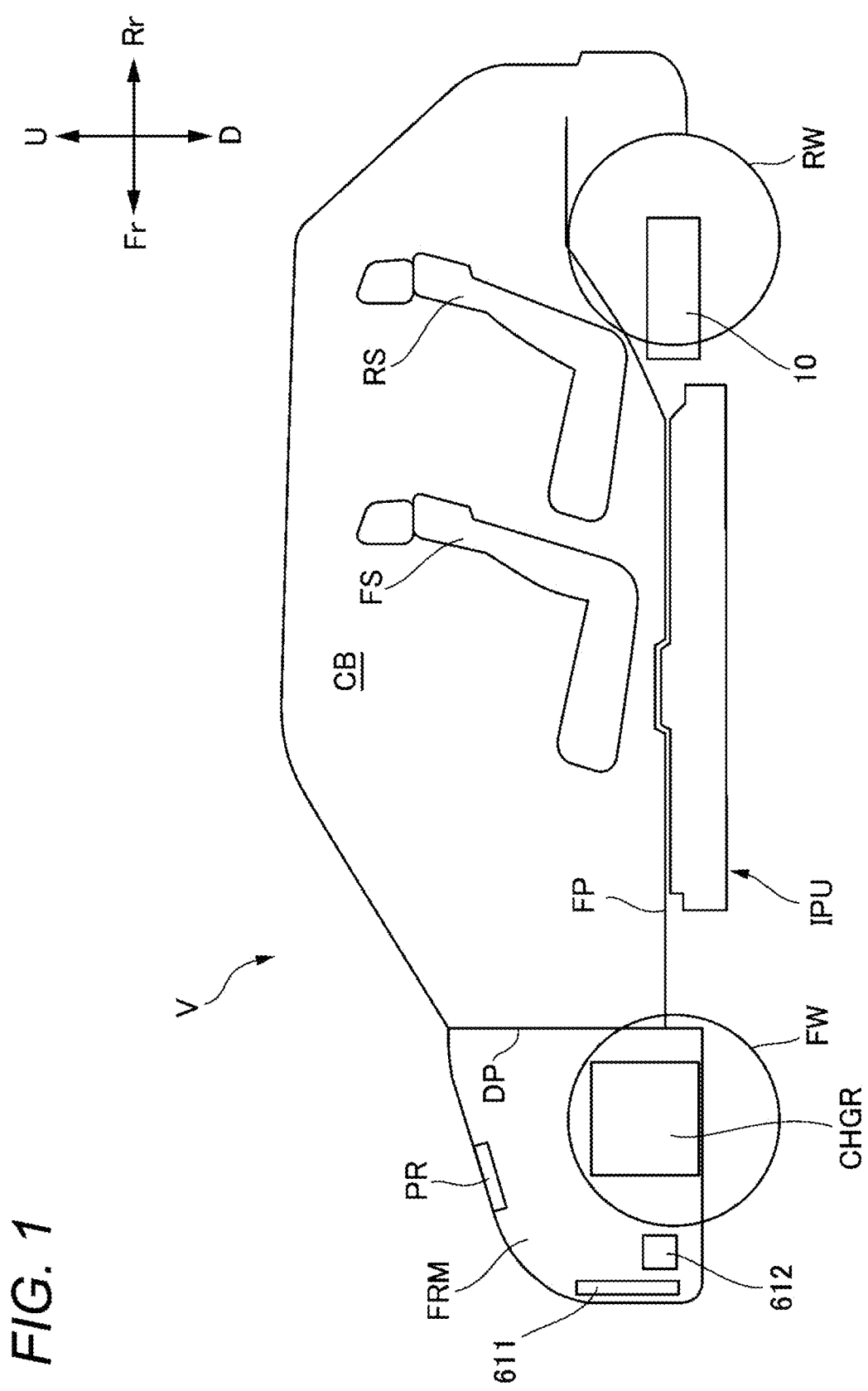
FIG. 1 is a schematic view of a vehicle mounted with a drive unit according to an embodiment of the present disclosure, as viewed from the left.

A vehicle mounted with a drive unit according to an embodiment of the present disclosure will be described below with reference to the accompanying drawings. The drawings are viewed from the directions of reference signs. In the present specification and the like, in order to simplify and clarify the description, the front-rear, left-right, and upper-lower directions are described according to directions viewed from the driver of the vehicle. In the drawings, the front side of the vehicle is shown as Fr, the rear side as Rr, the left side as L, the right side as R, the upper side as U, and the lower side as D.

[Overall Configuration of Vehicle]

As illustrated in FIG. 1, a vehicle V according to the present embodiment includes a pair of left and right front wheels FW, a pair of left and right rear wheels RW, and a floor panel FP constituting the floor of the vehicle V. The vehicle V is divided, by a dash panel DP extending in the upper-lower direction above the floor panel FP, into a passenger compartment CB and a front room FRM in front of the passenger compartment CB. The passenger compartment CB is provided with front seats FS and rear seats RS.

The vehicle V includes a drive unit 10 serving as a drive source, a battery pack IPU for storing the electric power to be supplied to the drive unit 10, a charge and power supply control device CHGR for controlling the input and output power of the battery pack IPU, a power-receiving portion PR capable of receiving power from an external power supply, a radiator 611 that allows cooling water R1 for cooling a control device 50 to be described later of the drive unit 10 to flow, and a cooling water pump 612 for pressuring and feeding the cooling water R1. The cooling water R1 is, for example, cooling water called LLC (long life coolant).

The drive unit 10 is disposed behind the rear seats RS and below the floor panel FP. The battery pack IPU is disposed below the floor panel FP and below the floor of the passenger compartment CB. The battery pack IPU accommodates a plurality of battery modules in which a plurality of battery cells are stacked. Each battery cell is a rechargeable secondary battery such as a lithium-ion battery or an all-solid-state battery.

The charge and power supply control device CHGR is accommodated in the front room FRM. The power-receiving portion PR is provided on the upper surface of the front room FRM and is electrically connected to the charge and power supply control device CHGR. The radiator 611 is accommodated in the front room FRM, and is disposed in the vicinity of the front end in the front room FRM. The radiator 611 is a heat exchanger for cooling the cooling water R1 by heat exchange between the flowing cooling water R1 and external air due to the traveling wind of the vehicle V. The cooling water pump 612 is accommodated in the front room FRM.

[Overall Configuration of Drive Unit]

Figure 2:
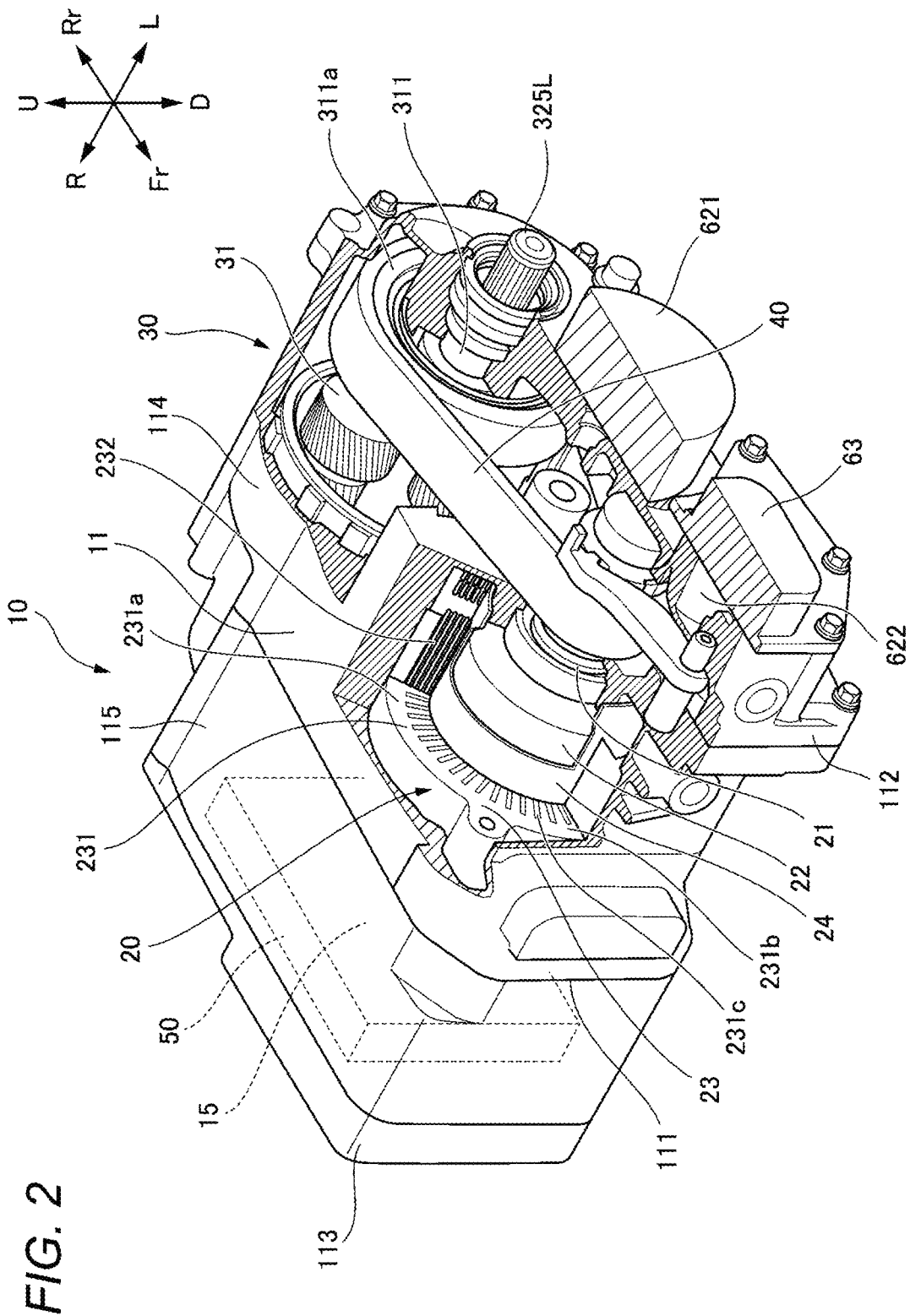
FIG. 2 is a perspective view of the drive unit according to the embodiment of the present disclosure, with a part thereof cut out.
Figure 3:
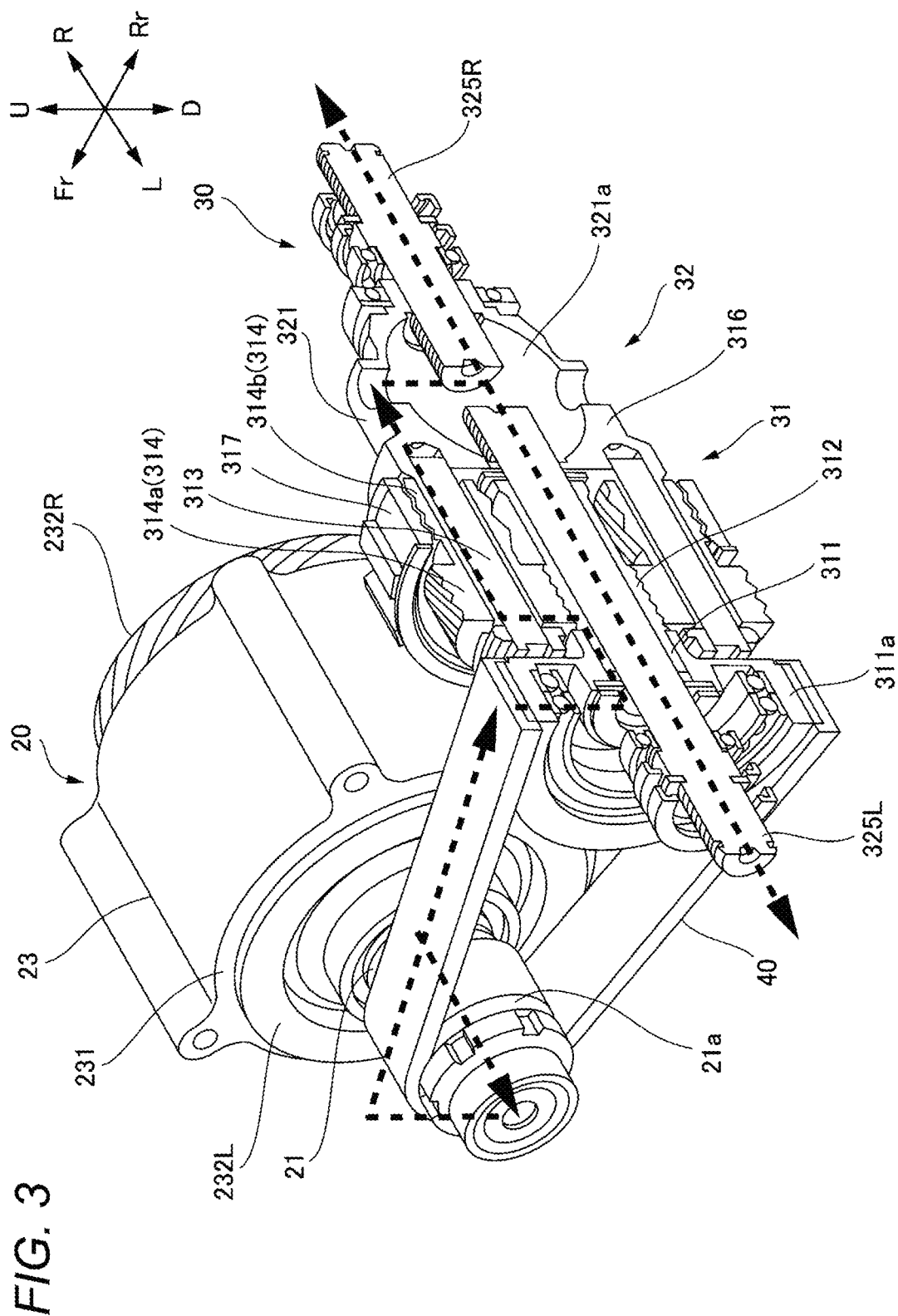
FIG. 3 is a partial perspective cross-sectional view illustrating a power transmission path in the drive unit in FIG. 2.

As illustrated in FIGS. 2 and 3, the drive unit 10 includes a drive motor 20, a speed reducer 30 for outputting the power output from the drive motor 20 to the outside at a reduced speed, a power transmission chain 40 for transmitting the power output from the drive motor 20 to the speed reducer 30, a control device 50 for controlling the drive motor 20, an oil pump 621 for pressuring and feeding the motor cooling oil R2, and an oil cooler 63 for performing heat exchange between the cooling water R1 and the motor cooling oil R2. The motor cooling oil R2 is, for example, oil called ATF (automatic transmission fluid).

In the drive unit 10, the drive motor 20, the speed reducer 30, the power transmission chain 40, and the control device 50 are accommodated in the drive unit case 11. The oil pump 621 and the oil cooler 63 are attached to the left side surface of the drive unit case 11.

The drive motor 20 is a so-called inner rotor motor including a drive shaft 21, a rotor 22 that is attached to the drive shaft 21 and rotates integrally with the drive shaft 21, and a stator 23 that faces the rotor 22 in the radial direction with a slight gap on the radially outer side of the rotor 22.

In the present embodiment, in the drive unit 10, the drive motor 20 is arranged such that the axial direction thereof (that is, the drive shaft 21) is oriented horizontally in the left-right direction. In this way, since the drive shaft 21 is oriented in the horizontal direction, the upper-lower dimension of the drive unit 10 can be made compact.

The stator 23 includes a stator core 231, and a coil 232 attached to the stator core 231 and configured with a plurality of winding wires of a U phase, a V phase, and a W phase.

The stator core 231 is formed by laminating, in the axial direction, a plurality of thin plate-shaped magnetic steel plates having a substantially annular shape.

The stator core 231 includes a yoke 231*a* having a substantially annular shape that forms an outer ring of the stator core 231 when viewed from the axial direction, and a plurality of teeth 231*b* that protrude in the radial direction from the inner peripheral surface of the yoke 231*a* toward the center. The teeth 231*b* are arranged at equal intervals along the circumferential direction of the stator core 231 when viewed in the axial direction. A slot 231*c* is formed between the teeth 231*b* adjacent in the circumferential direction of the stator core 231. A plurality of slots 231*c* are formed at equal intervals along the circumferential direction of the stator core 231. The teeth 231*b* and the slots 231*c* extend along the axial direction of the stator core 231.

The coil 232 is configured with a plurality of conductor segments inserted into the slots 231*c* of the stator core 231. The conductor segments are inserted into all the slots 231*c* formed along the circumferential direction of the stator core 231.

The coil 232 includes a left coil end 232L that protrudes axially outward from the left end surface on one side in the axial direction of the stator core 231, and a right coil end 232R that protrudes axially outward from the right end surface on the other side in the axial direction of the stator core 231.

The left end of the drive shaft 21 is attached with a drive sprocket 21*a* wound around by the power transmission chain 40. The drive sprocket 21*a* rotates integrally with the drive shaft 21.

Figure 4:
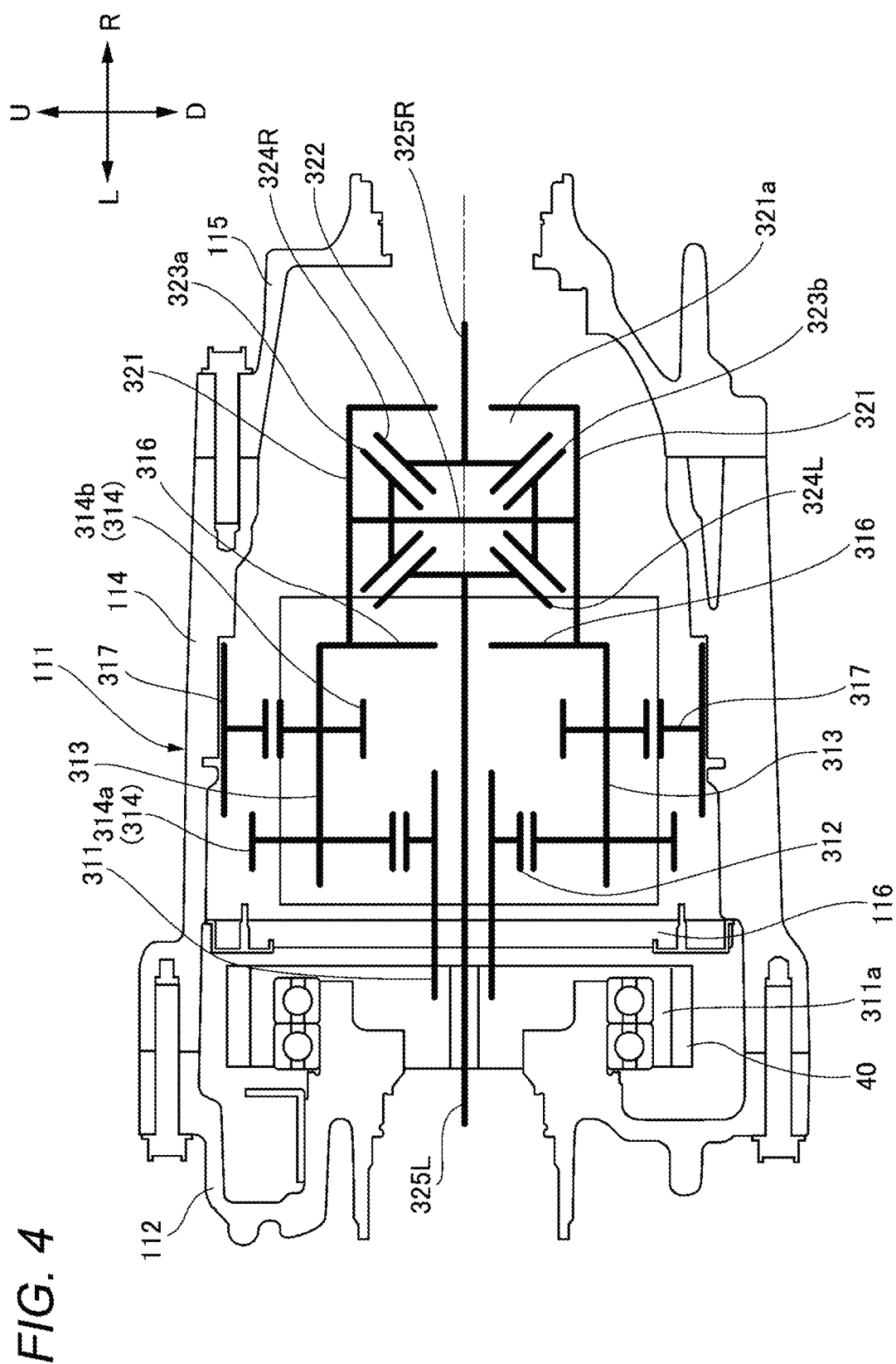
FIG. 4 is a skeleton diagram of a speed reducer in the drive unit in FIG. 2.
Figure 5:
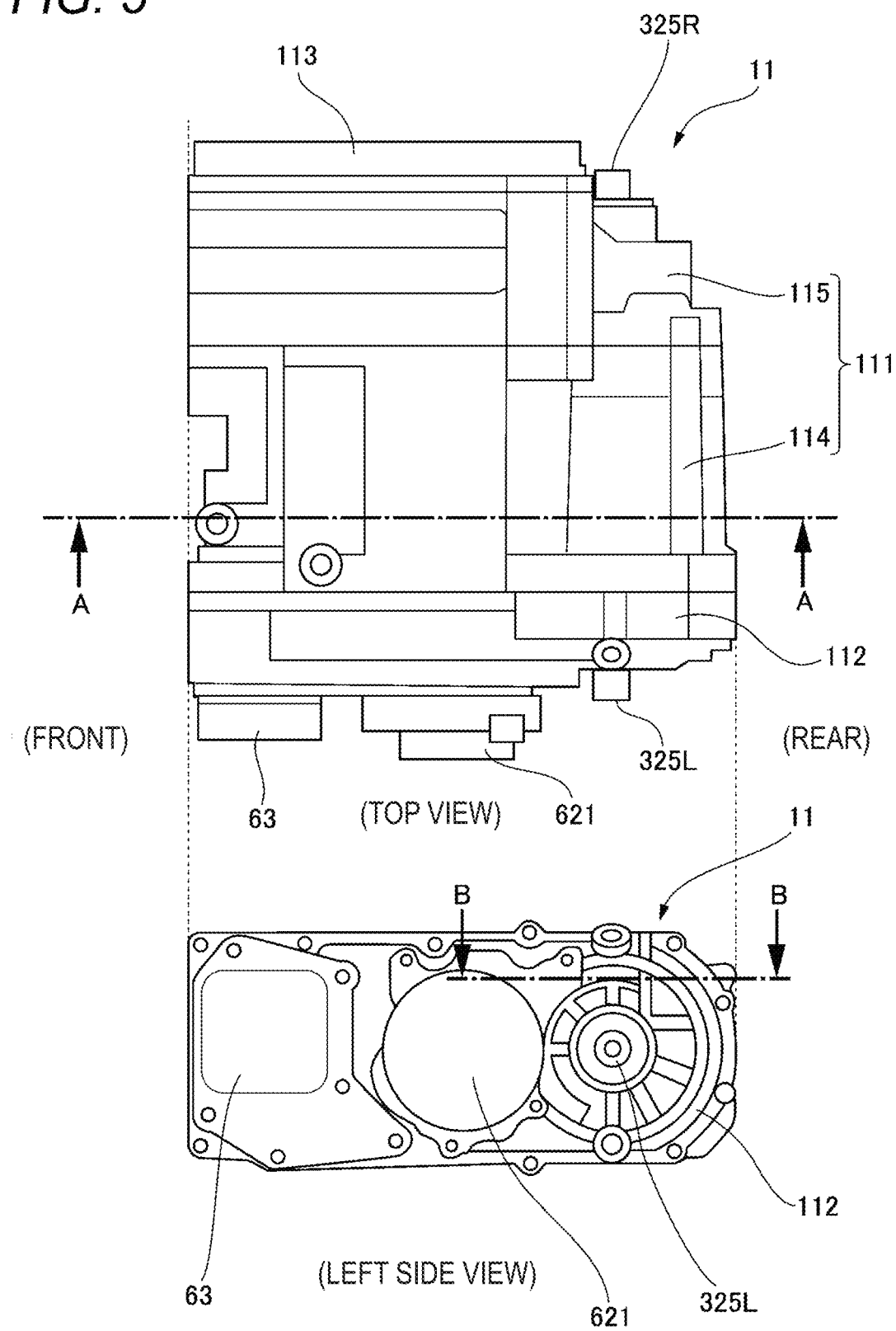
FIG. 5 is a top view and a left side view of the drive unit in FIG. 2.

As illustrated in FIGS. 3 and 4, the speed reducer 30 includes a planetary gear mechanism 31 and a differential gear mechanism 32.

First, the planetary gear mechanism 31 will be described.

The planetary gear mechanism 31 includes an input shaft 311, a sun gear 312, a plurality of planetary pinion shafts 313, stepped pinions 314 of the same number as the planetary pinion shafts 313, a planetary carrier 316, and a ring gear 317.

In the present embodiment, the planetary gear mechanism 31 is aligned on the rear with drive motor 20 in the front-rear direction. The planetary gear mechanism 31 is arranged such that the axial direction thereof (that is, the input shaft 311) is oriented in the left-right direction parallel to the axial direction of the drive motor 20. The input shaft 311 of the planetary gear mechanism 31 is arranged at substantially the same height in the upper-lower direction as the drive shaft 21 of the drive motor 20. The outer diameter dimension of the planetary gear mechanism 31 is substantially the same as the outer diameter dimension of the drive motor 20, and the height in the upper-lower direction of the drive unit 10 is reduced.

The input shaft 311 is a hollow shaft, and has a left drive shaft to be described later inserted therein. The left end of the input shaft 311 is attached with a driven sprocket 311*a* wound around by the power transmission chain 40. The driven sprocket 311*a* rotates integrally with the input shaft 311. The driven sprocket 311*a* has a larger diameter than the drive sprocket 21*a* attached to the drive shaft 21 of the drive motor 20, and the number of teeth of the driven sprocket 311*a* is greater than the number of teeth of the drive sprocket 21*a*.

The sun gear 312 is an external gear provided on the input shaft 311 and rotates integrally with the input shaft 311 on the same rotary shaft.

The plurality of planetary pinion shafts 313 are arranged at equal intervals in the circumferential direction along the outer peripheral surface of the sun gear 312 while being oriented in the left-right direction in parallel with the input shaft 311 on the radially outer side of the sun gear 312. In the present embodiment, four planetary pinion shafts 313 are arranged on the radially outer side of the sun gear 312 at intervals of 90 degrees in the circumferential direction along the circumferential direction of the input shaft 311.

Each planetary pinion shaft 313 rotatably supports a stepped pinion 314 having a first planetary gear 314a and a second planetary gear 314b that rotate integrally. In the present embodiment, in each planetary pinion shaft 313, the first planetary gear 314a is arranged on the left and the second planetary gear 314b is arranged on the right. Therefore, four first planetary gears 314a and four second planetary gears 314b are provided in an annular shape at intervals of 90 degrees in the circumferential direction of the input shaft 311.

The first planetary gear 314a is an external gear arranged on the outer peripheral surface of the sun gear 312 and meshing with the sun gear 312. The four first planetary gears 314a are provided in an annular shape at intervals of 90 degrees along the outer peripheral surface of the sun gear 312. The four first planetary gears 314a mesh with the outer peripheral surface of the sun gear 312.

The second planetary gear 314b is an external gear arranged on the inner peripheral surface of the ring gear 317 and meshing with the ring gear 317. The four second planetary gears 314b are provided in an annular shape at intervals of 90 degrees along the inner peripheral surface of the ring gear 317. In the present embodiment, the second planetary gear 314b is an external gear having a smaller diameter than the first planetary gear 314a.

The planetary carrier 316 couples the four planetary pinion shafts 313. The planetary carrier 316 can rotate integrally with the four planetary pinion shafts 313 around a rotary shaft coaxial with the input shaft 311 (and the sun gear 312).

Therefore, the stepped pinion 314 having the first planetary gear 314a and the second planetary gear 314b can rotate around the planetary pinion shaft 313, and can revolve around a rotary shaft coaxial with the input shaft 311 (and the sun gear 312) integrally with the planetary pinion shaft 313. The planetary carrier 316 rotates integrally with the revolution of the stepped pinion 314 around a rotary shaft coaxial with the input shaft 311 (and the sun gear 312).

The ring gear 317 is an internal gear having an annular shape arranged surrounding the four second planetary gears 314b arranged in an annular shape, and the inner peripheral surface thereof meshes with the second planetary gears 314b. In the present embodiment, the ring gear 317 is fixed to the drive unit case 11, and the ring gear 317 itself does not rotate.

Next, the differential gear mechanism 32 will be described.

The differential gear mechanism 32 includes a differential case 321, a differential pinion shaft 322 supported by the differential case 321, a first bevel gear 323a and a second bevel gear 323b that are rotatably supported by the differential pinion shaft 322, a left side gear 324L and a right side gear 324R that mesh with the first bevel gear 323a and the second bevel gear 323b, and a left drive shaft 325L and a right drive shaft 325R.

The differential case 321 is formed integrally with the planetary carrier 316 of the planetary gear mechanism 31. Therefore, the differential case 321 rotates integrally with the planetary carrier 316 of the planetary gear mechanism 31 around a rotary shaft coaxial with the input shaft 311. The differential case 321 includes an accommodating portion 321a that accommodates the differential pinion shaft 322, the first bevel gear 323a, the second bevel gear 323b, the left side gear 324L, and the right side gear 324R.

The differential pinion shaft 322 is accommodated in the accommodating portion 321a of the differential case 321 and is supported by the differential case 321. The differential pinion shaft 322 is arranged in the accommodating portion 321a of the differential case 321 in a manner orthogonal to the rotary shaft of the differential case 321. The differential pinion shaft 322 rotates integrally with the differential case 321 around the rotary shaft of the differential case 321.

The first bevel gear 323a is accommodated in the accommodating portion 321a of the differential case 321 and is rotatably supported by the differential pinion shaft 322. The first bevel gear 323a has a substantially truncated conical shape whose upper surface is oriented toward the rotary shaft of the differential case 321, and has a gear formed on the truncated conical side surface.

The second bevel gear 323b is accommodated in the accommodating portion 321a of the differential case 321 and is rotatably supported by the differential pinion shaft 322 while facing the first bevel gear 323a. The second bevel gear 323b has a substantially truncated conical shape whose upper surface is oriented toward the rotary shaft of the differential case 321, and has a gear formed on the truncated conical side surface.

The left side gear 324L is accommodated in the accommodating portion 321a of the differential case 321, and is arranged to the left of the differential pinion shaft 322 and between the first bevel gear 323a and the second bevel gear 323b. The rotary shaft of the left side gear 324L is coaxial with the rotary shaft of the differential case 321. The left side gear 324L has a substantially truncated conical shape whose upper surface is oriented toward the differential pinion shaft 322 (that is, rightward), and has a gear formed on the truncated conical side surface. The left side gear 324L meshes with both the first bevel gear 323a and the second bevel gear 323b.

The right side gear 324R is accommodated in the accommodating portion 321a of the differential case 321, and is arranged to the right of the differential pinion shaft 322 and between the first bevel gear 323a and the second bevel gear 323b, in a manner facing the left side gear 324L in the left-right direction with the differential pinion shaft 322 interposed therebetween. The rotary shaft of the right side gear 324R is coaxial with the rotary shaft of the differential case 321 and the rotary shaft of the left side gear 324L. The right side gear 324R has a substantially truncated conical shape whose upper surface is oriented toward the differential pinion shaft 322 (that is, leftward), and has a gear formed on the truncated conical side surface. The right side gear 324R meshes with both the first bevel gear 323a and the second bevel gear 323b.

The left drive shaft 325L is inserted through the hollow portion of the input shaft 311 of the planetary gear mechanism 31 and the center of the driven sprocket 311a, and extends in the left-right direction coaxially with the rotary shaft of the input shaft 311 of the planetary gear mechanism 31 and the rotary shaft of the differential case 321. The left drive shaft 325L has the left side gear 324L attached to the right end thereof and the left rear wheel RW attached to the left end thereof. Therefore, the left side gear 324L, the left drive shaft 325L, and the left rear wheel RW rotate integrally.

The right drive shaft 325R extends in the left-right direction coaxially with the rotary shaft of the input shaft 311 of the planetary gear mechanism 31, the rotary shaft of the differential case 321, and the rotary shaft of the left drive shaft 325L. The right drive shaft 325R has the right side gear 324R attached to the left end thereof and the right rear wheel RW attached to the right end thereof. Therefore, the right side gear 324R, the right drive shaft 325R, and the right rear wheel RW rotate integrally.

Thus, since the differential case 321 is formed integrally with the planetary carrier 316 of the planetary gear mechanism 31, the planetary gear mechanism 31 and the differential gear mechanism 32 can be integrated. This can further downsize the speed reducer 30.

Next, the power transmission path of the power output from the drive motor 20 will be described.

The power generated by the drive motor 20 is output from the drive shaft 21. The drive sprocket 21a attached to the drive shaft 21 rotates integrally with the drive shaft 21. When the drive sprocket 21a rotates, the driven sprocket 311a is rotated by the power transmission chain 40 wound around the drive sprocket 21a and the driven sprocket 311a attached to the input shaft 311 of the planetary gear mechanism 31. The input shaft 311 of the planetary gear mechanism 31 rotates integrally with the driven sprocket 311a. At this time, since the number of teeth of the driven sprocket 311a is larger than the number of teeth of the drive sprocket 21a, the rotation of the drive shaft 21 is input to the input shaft 311 of the planetary gear mechanism 31 at a speed reduced through the drive sprocket 21a, the power transmission chain 40, and the driven sprocket 311a.

In the planetary gear mechanism 31, the power input to the input shaft 311 is transmitted to the stepped pinion 314 via the sun gear 312. Then, the stepped pinion 314 rotates and revolves. The planetary carrier 316 rotates integrally with the revolution of the stepped pinion 314. In the planetary gear mechanism 31, since the ring gear 317 is fixed, the rotation of the input shaft 311 is transmitted to the planetary carrier 316 at a speed reduced at a predetermined speed reduction ratio.

In the differential gear mechanism 32, the differential case 321 is formed integrally with the planetary carrier 316 of the planetary gear mechanism 31, and thus rotates integrally with the rotation of the planetary carrier 316. Therefore, the power input to the input shaft 311 of the planetary gear mechanism 31 is decelerated at a predetermined speed reduction ratio and input to the differential case 321 via the planetary carrier 316.

Therefore, the power output from the drive shaft 21 is input to the differential case 321 of the differential gear mechanism 32 via the power transmission chain 40 and the planetary gear mechanism 31, and the differential pinion shaft 322 revolves around the rotary shaft of the differential case 321 together with the differential case 321.

When the vehicle V travels straight, there is no rotation difference between the left and right rear wheels RW, and thus the left side gear 324L and the right side gear 324R that mesh with the first bevel gear 323a and the second bevel gear 323b rotate according to the rotation of the differential pinion shaft 322. The left rear wheel RW rotates when the left drive shaft 325L rotates integrally with the rotation of the left side gear 324L, and the right rear wheel RW rotates when the right drive shaft 325R rotates integrally with the rotation of the right side gear 324R.

When the vehicle V turns, as the differential pinion shaft 322 revolves, the first bevel gear 323a and the second bevel gear 323b rotate such that the rotation speed of the rear wheel RW on the inner side during turning decreases whereas the rotation speed of the rear wheel RW on the outer side during turning increases. Meanwhile, the left side gear 324L and the right side gear 324R that mesh with the first bevel gear 323a and the second bevel gear 323b, rotate at different rotation speeds such that the rotation speed of the rear wheel RW on the inner side during turning decreases whereas the rotation speed of the rear wheel RW on the outer side during turning increases. The left rear wheel RW rotates when the left drive shaft 325L rotates integrally with the rotation of the left side gear 324L, and the right rear wheel RW rotates when the right drive shaft 325R rotates integrally with the rotation of the right side gear 324R. Therefore, when the vehicle V turns, the left drive shaft 325L and the right drive shaft 325R rotate such that the rotation speed of the rear wheel RW on the inner side during turning decreases whereas the rotation speed of the rear wheel RW on the outer side during turning increases.

In this manner, as indicated by the arrows in FIG. 3, the power output from the drive motor 20 is input to the speed reducer 30 at a speed reduced through the drive sprocket 21a, the driven sprocket 311a, and the power transmission chain 40. The power is appropriately distributed and transmitted to the left and right rear wheels RW by the differential gear mechanism 32 at a speed further reduced by the planetary gear mechanism 31.

By using the planetary gear mechanism 31 in the speed reduction mechanism, it is possible to obtain a desired speed reduction ratio while limiting an increase in dimension in the radial direction relative to the rotary shaft direction.

Next, the drive unit case 11 will be described with reference to FIGS. 5 to 10.

The drive unit case 11 includes a main case 111, a left side cover 112 covering the left side surface of the main case 111, and a right side cover 113 covering the right side surface of the main case 111. The main case 111 is divided into right and left portions, that is, a left main case 114 and a right main case 115.

The main case 111 is divided into a motor chamber 12 in which the drive motor 20 is accommodated, a gear chamber 13 the speed reducer 30 is accommodated, a chain chamber 14 in which the power transmission chain 40 is accommodated, and a controller chamber 15 in which the control device 50 is accommodated. The motor chamber 12 and the gear chamber 13 are formed side by side in the front-rear direction such that the motor chamber 12 is located on the front side and the gear chamber 13 is located on the rear side. The chain chamber 14 is formed to the left of the motor chamber 12 and the gear chamber 13, and is open leftward. The controller chamber 15 is formed to the right of the motor chamber 12 and the gear chamber 13, and is open rightward.

The left side cover 112 covers the left opening of the chain chamber 14. An oil pump 621 and an oil cooler 63 are fixed to the left side surface of the left side cover 112.

Figure 6:
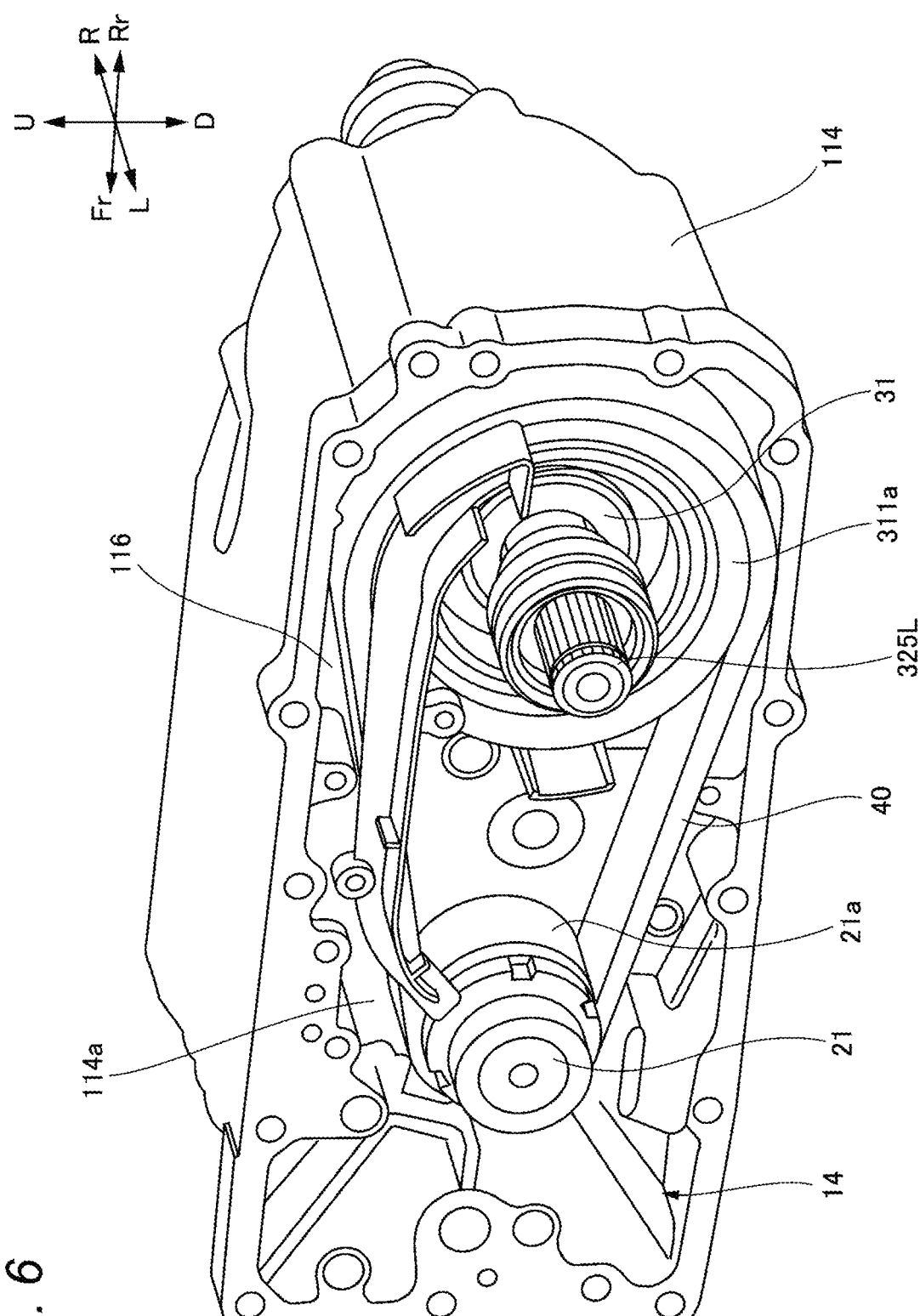
FIG. 6 is a perspective view of a left main case of the drive unit in FIG. 2 as viewed from the left.
Figure 7:
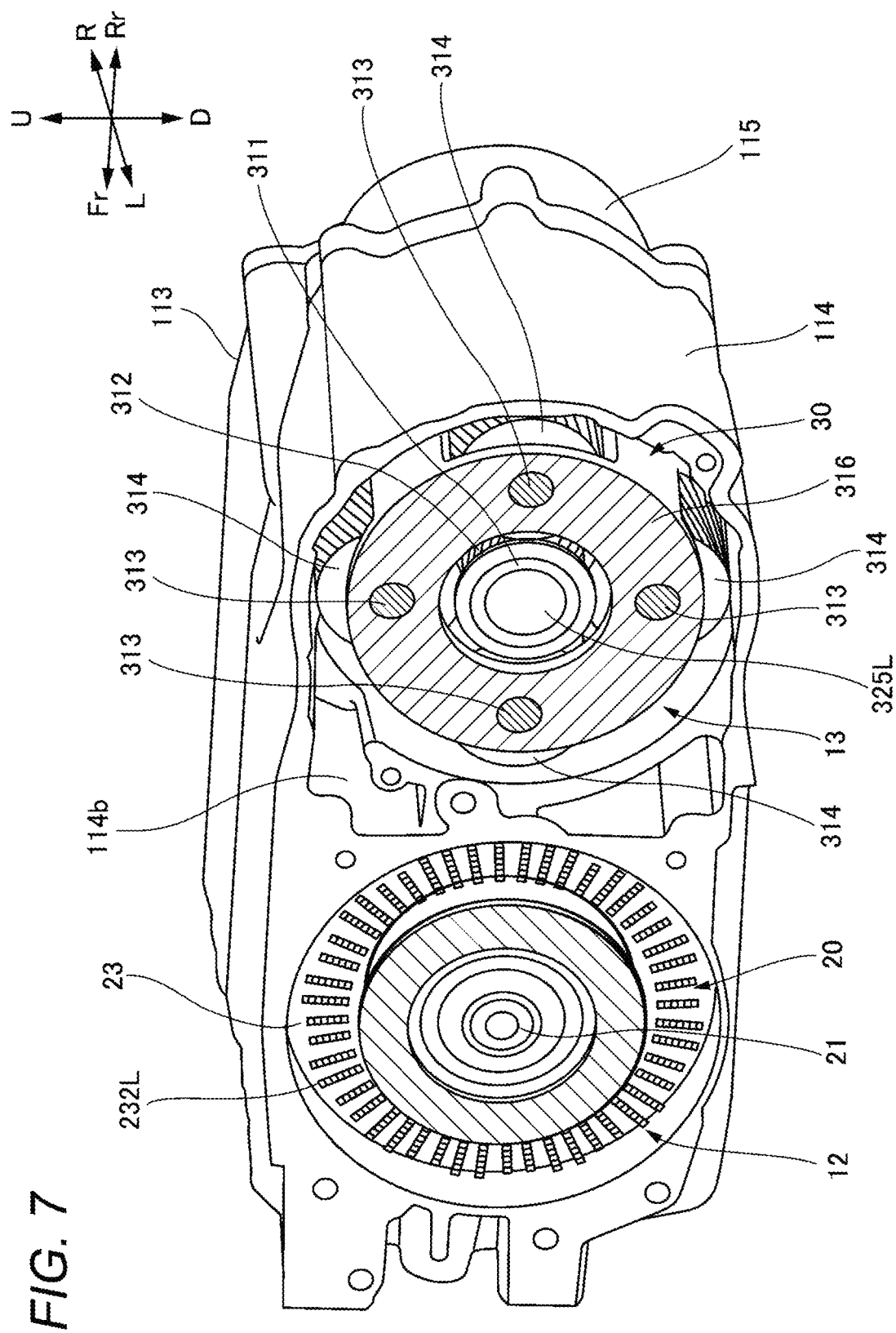
FIG. 7 is a cross-sectional view taken along a line A-A in FIG. 5.
Figure 8:
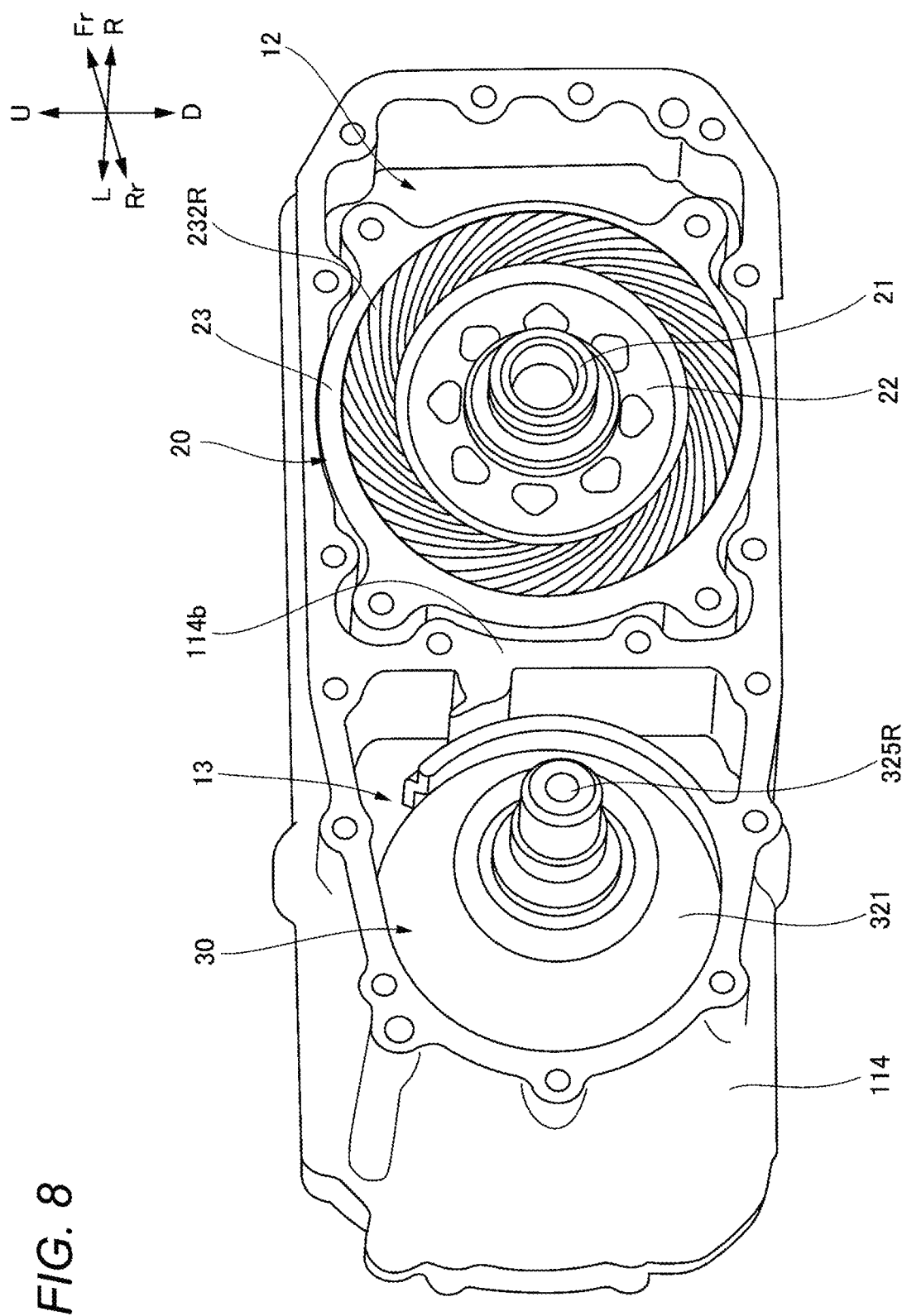
FIG. 8 is a perspective view of the left main case of the drive unit in FIG. 2 as viewed from the right.

As illustrated in FIGS. 6 to 8, the left main case 114 forms the motor chamber 12, the gear chamber 13, and the chain chamber 14. The left main case 114 includes a first dividing wall 114a dividing the motor chamber 12 and the chain chamber 14, and a second dividing wall 114b dividing the motor chamber 12 and the gear chamber 13. The first dividing wall 114a extends in the upper-lower direction and the front-rear direction between the drive sprocket 21a and the drive motor 20. The second dividing wall 114b extends in the upper-lower direction and the left-right direction between the drive motor 20 and the speed reducer 30.

In the left main case 114, the motor chamber 12 is open rightward. In the left main case 114, the gear chamber 13 and the chain chamber 14 communicate with each other, whereas the left main case 114 is provided with a baffle plate 116 partitioning the gear chamber 13 and the chain chamber 14 (see also FIG. 4). The baffle plate 116 extends in the upper-lower direction and the front-rear direction between the driven sprocket 311a and the sun gear 312.

Figure 9:
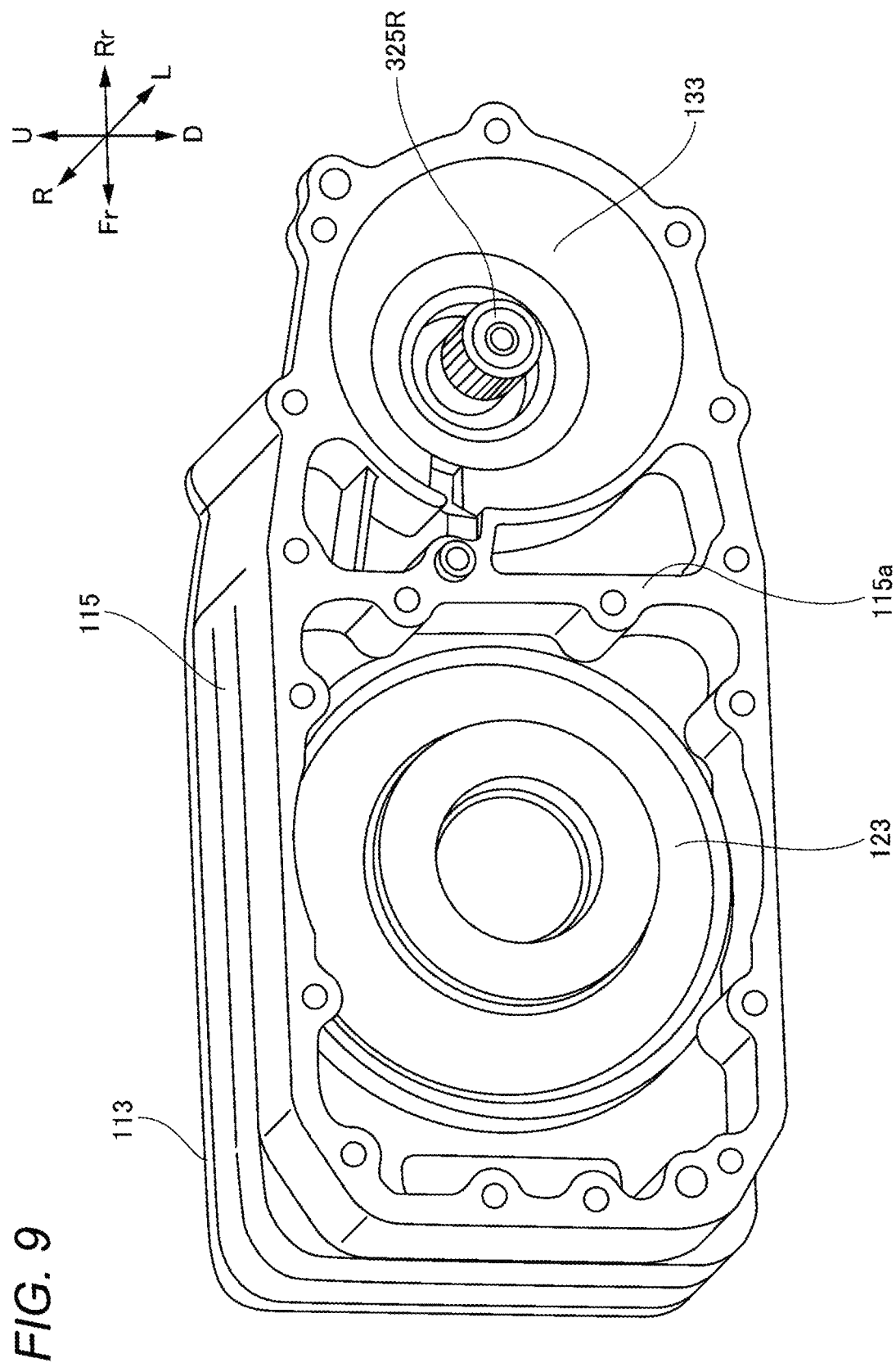
FIG. 9 is a perspective view of a right main case of the drive unit in FIG. 2 as viewed from the left.
Figure 10:
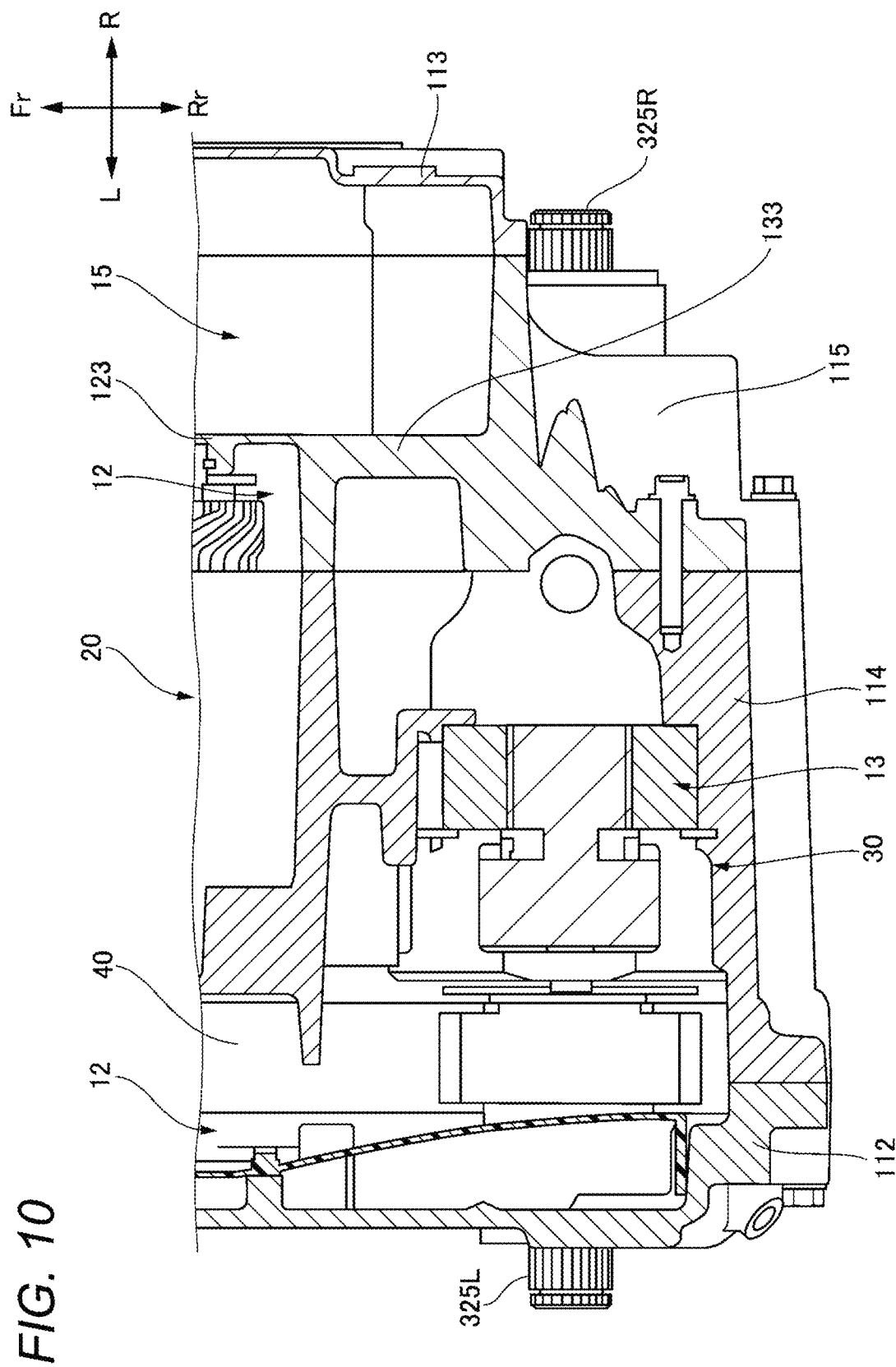
FIG. 10 is a cross-sectional view taken along a line B-B in FIG. 5.

As illustrated in FIGS. 9 and 10, the right main case 115 includes a right wall 123 that covers the right opening of the motor chamber 12 formed in the left main case 114. The right main case 115 further includes a right wall 133 that covers the right opening of the gear chamber 13 formed in the left main case 114, and a third dividing wall 115a that divides the motor chamber 12 and the gear chamber 13. The right main case 115 forms the controller chamber 15 to the right of the right wall 123 including the front region of the right wall 133. In the right main case 115, the controller chamber 15 is open rightward.

The right side cover 113 covers the right opening of the controller chamber 15.

(Temperature Control System)

Figure 11:
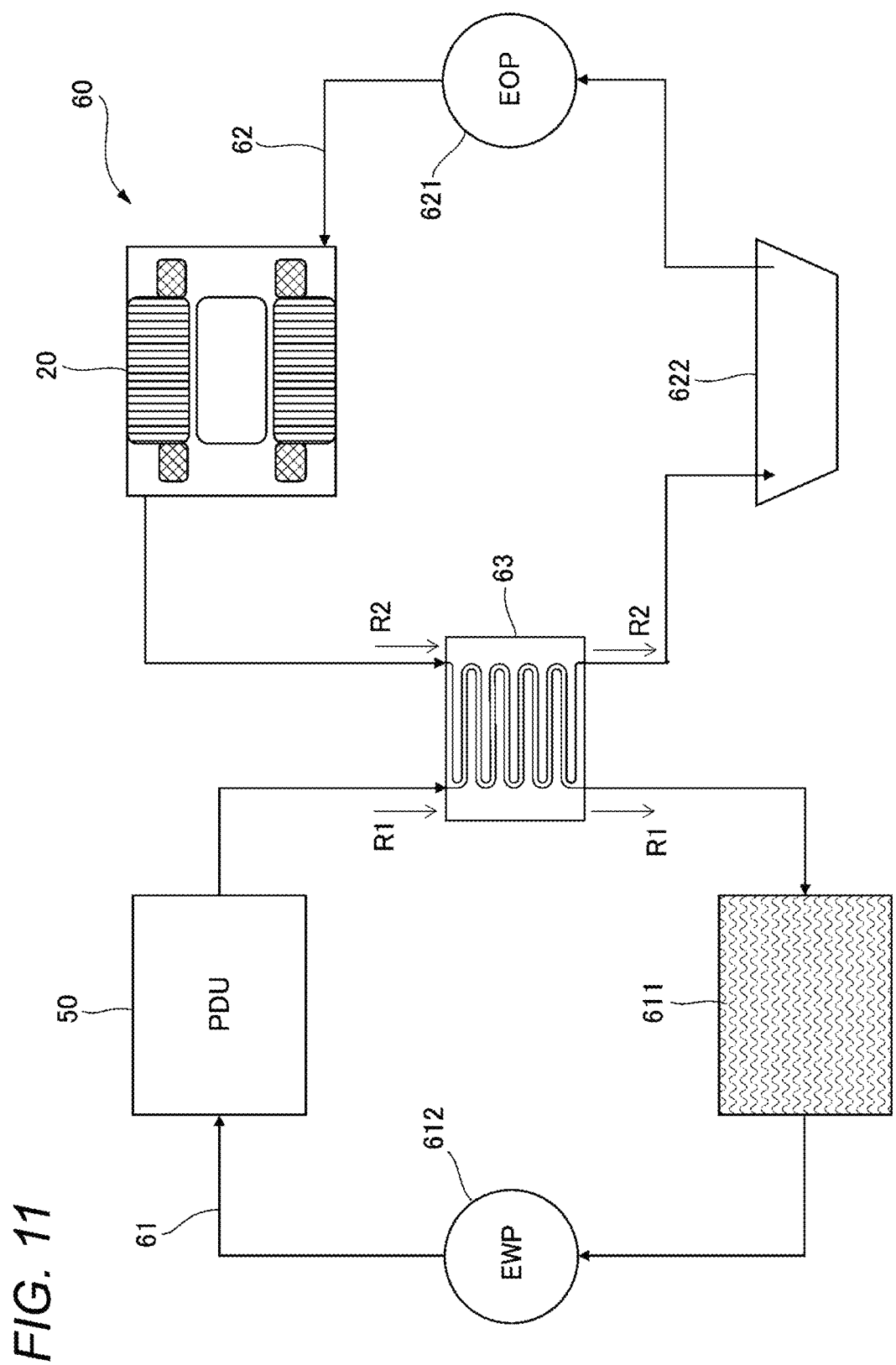
FIG. 11 is a block diagram of a temperature control system in the drive unit in FIG. 2.

As illustrated in FIG. 11, the vehicle V includes a temperature control system 60. The temperature control system 60 includes a first temperature control circuit 61 for circulating the above-described cooling water R1 and performing temperature control of the control device 50, a second temperature control circuit 62 for circulating the above-described motor cooling oil R2 and performing temperature control and lubrication of the drive motor 20, and the oil cooler 63 described above. As described above, the oil cooler 63 performs heat exchange between the cooling water R1 circulating in the first temperature control circuit 61 and the motor cooling oil R2 circulating in the second temperature control circuit 62.

In the first temperature control circuit 61, the cooling water R1 circulates through the cooling water pump 612, the control device 50, the oil cooler 63, and the radiator 611. The cooling water R1 pressured and fed from the cooling water pump 612 is supplied to the control device 50 to control the temperature of the control device 50, then supplied from the control device 50 to the oil cooler 63 to perform heat exchange with the motor cooling oil R2 flowing through the second temperature control circuit 62, supplied to the radiator 611, cooled by heat exchange with external air, and then returned to the cooling water pump 612.

In the second temperature control circuit 62, the motor cooling oil R2 circulates through the oil pump 621, the drive motor 20, and the oil cooler 63. The inside the drive unit case 11 is formed with a storage portion 622 for temporarily storing the motor cooling oil R2 cooled in the oil cooler 63. The motor cooling oil R2 temporarily stored in the storage portion 622 is pressured and fed from the oil pump 621 and supplied into the drive unit case 11 to control the temperature of the drive motor 20. The motor cooling oil R2 is supplied from the drive unit case 11 to the oil cooler 63, cooled by the heat exchange with the cooling water R1 flowing through the first temperature control circuit 61, and then flows into the storage portion 622 and is temporarily stored in the storage portion 622 again.

The gear chamber 13 and the chain chamber 14 partitioned by the baffle plate 116 store a common fluid, that is, a lubrication oil R3. The lubrication oil R3 is, for example, oil called ATF (automatic transmission fluid). The lubrication oil R3 has the same component as the motor cooling oil R2. The lubrication oil R3 lubricates the speed reducer 30 provided in the gear chamber 13, and the drive sprocket 21a, the driven sprocket 311a, the power transmission chain 40, and the like provided in the chain chamber 14. The mist-like motor cooling oil R2 in the second temperature control circuit 62 may be discharged into the gear chamber 13 from the breather hole 112b, which will be described later, but the lubrication oil R3 is prevented from flowing into the second temperature control circuit 62.

Next, a flow path of the motor cooling oil R2 of the motor chamber 12 in the second temperature control circuit 62 of the temperature control system 60 will be described with reference to FIGS. 12 to 17.

Figure 12:
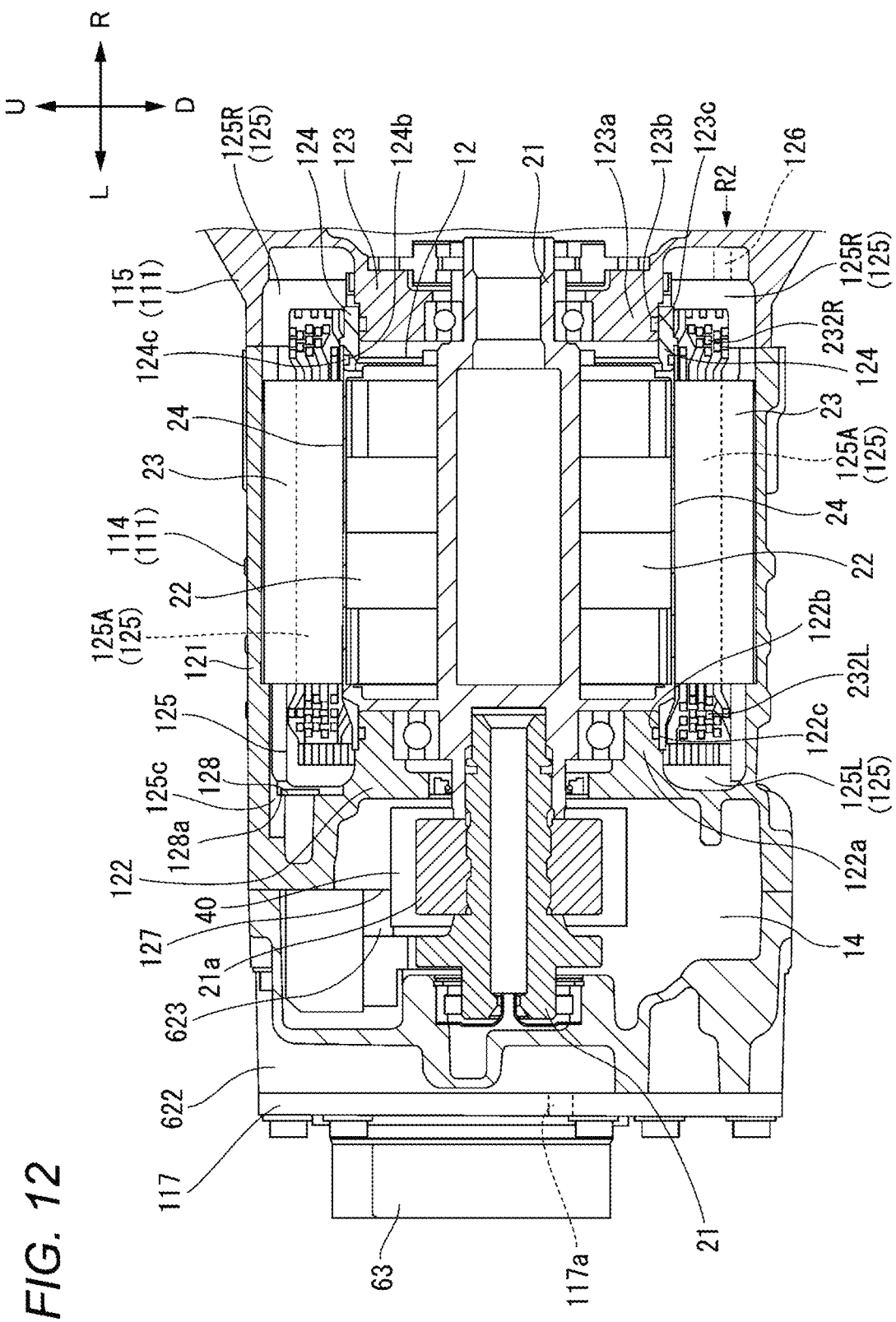
FIG. 12 is a cross-sectional view of the drive unit illustrated in FIG. 2 as viewed from the rear, which is cut in the left-right direction around the axis of the drive shaft.

As illustrated in FIG. 12, the left main case 114 forms a tubular outer peripheral wall 121 extending in the left-right direction of the motor chamber 12, and a left wall 122 of the motor chamber 12. The right main case 115 forms the right wall 123 of the motor chamber 12.

In the left main case 114, the tubular outer peripheral wall 121 covers the outer periphery of the drive motor 20. The left wall 122 extends radially inward from the outer peripheral wall 121 and covers the left side of the drive motor 20. In the right main case 115, the right wall 123 is in contact with the right end of the outer peripheral wall 121 of the left main case 114, and covers the right side of the drive motor 20.

The left wall 122 includes an annular protruding wall 122a extending in the axial direction toward the axial center of the drive motor 20 on the radially inner side of the left coil end 232L. The protruding wall 122a extends from the left wall 122 to a position that overlaps with at least a part of the left coil end 232L in the axial direction. The outer peripheral surface of the annular protruding wall 122a is formed with an annular seal groove 122b. The seal groove 122b is provided with an annular O-ring 122c.

The right wall 123 includes an annular protruding wall 123a extending in the axial direction toward the axial center of the drive motor 20 on the radially inner side of the right coil end 232R. The protruding wall 123a extends from the right wall 123 to a position that overlaps with at least a part of the right coil end 232R in the axial direction. The outer peripheral surface of the annular protruding wall 123a is formed with an annular seal groove 123b. The seal groove 123b is provided with an annular O-ring 123c.

The outer peripheral surface of the annular protruding wall 123a is fitted to a cylindrical seal wall member 124. The outer peripheral surface of the protruding wall 123a and the inner peripheral surface of the cylindrical seal wall member 124 are sealed by the O-ring 123c. The seal wall member 124 extends in the axial direction to a position closer to the rotor 22 of the drive motor 20 and the left end surface of the stator 23 than the protruding wall 123a in the axial direction of the drive motor 20. The vicinity of the left end of the outer peripheral surface of the seal wall member 124 is formed with an annular seal groove 124b. The seal groove 124b is provided with an annular O-ring 124c.

In the drive motor 20, the gap in the radial direction between the rotor 22 and the stator 23 is provided with a seal cover 24 that extends cylindrically along the inner peripheral surface of the stator 23.

The left end of the seal cover 24 is fitted to the outer peripheral surface of the protruding wall 122a of the left wall 122. The outer peripheral surface of the protruding wall 122a and the inner peripheral surface of the left end of the seal cover 24 are sealed by the O-ring 122c.

The right end of the seal cover 24 is fitted to the outer peripheral surface of the seal wall member 124. The outer peripheral surface of the seal wall member 124 and the inner peripheral surface of the right end of the seal cover 24 are sealed by the O-ring 124c.

A space surrounded by the outer peripheral wall 121, the left wall 122, the protruding wall 122a, the seal cover 24, the seal wall member 124, the right wall 123, and the protruding wall 123a is a motor chamber internal oil flow path 125 that allows the motor cooling oil R2 to flow through. The motor chamber internal oil flow path 125 is a sealed space in the motor chamber 12.

The motor chamber internal oil flow path 125 includes a left annular flow path 125L that covers the left coil end 232L and is annular when viewed from the axial direction of the drive motor 20, a right annular flow path 125R that covers the right coil end 232R and is annular when viewed in the axial direction of the drive motor 20, and axial flow paths 125A formed by the slots 231c of the stator 23 on the radially outer side of the seal cover 24.

In the present embodiment, the lower portion of the right annular flow path 125R is provided with an oil introduction portion 126 for introducing the motor cooling oil R2 into the motor chamber internal oil flow path 125. The oil introduction portion 126 is oriented toward the axially outer side from the right wall 123 at the lower portion of the right annular flow path 125R. The upper portion of the left annular flow path 125L is provided with an oil discharge portion 127 for discharging the motor cooling oil R2 that has flown through the motor chamber internal oil flow path 125. The oil discharge portion 127 is oriented toward the axially outer side from the left wall 122 at the upper portion of the left annular flow path 125L.

Figure 15:
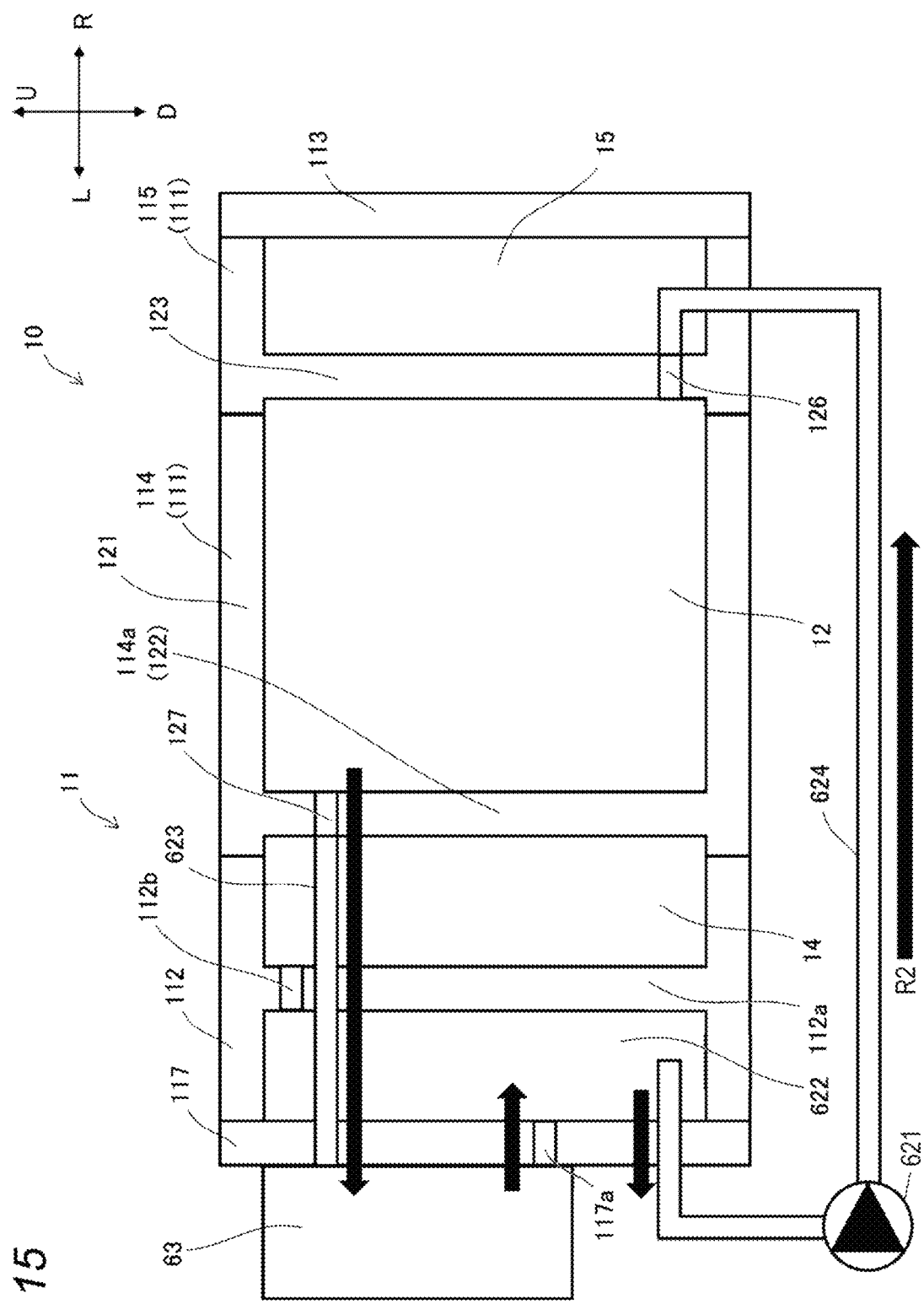
FIG. 15 is a schematic diagram of the drive unit in FIG. 2 cut in the left-right direction so as to intersect with the storage portion.
Figure 16:
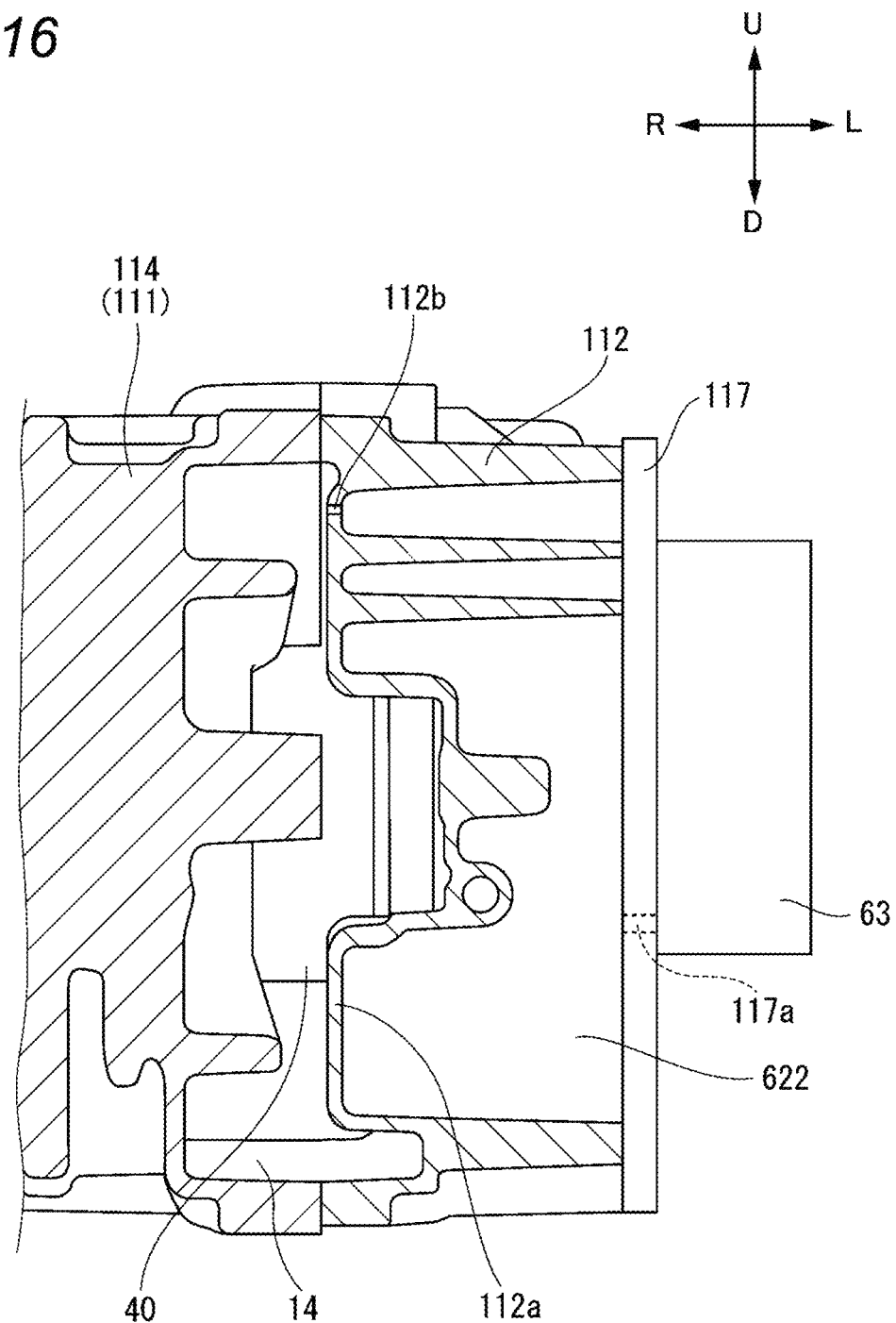
FIG. 16 is a perspective view of the vicinity of the storage portion in FIG. 2, which is cut in the left-right direction.

The motor cooling oil R2 pressured and fed from the oil pump 621 is introduced into the oil introduction portion 126 (see FIG. 15).

The motor cooling oil R2 introduced from the oil introduction portion 126 into the motor chamber internal oil flow path 125 flows through the right annular flow path 125R and also flows from the right to the left in the axial flow paths 125A. The motor cooling oil R2 flowing from the right to the left in the axial flow paths 125A flows into the left annular flow path 125L, and the motor chamber internal oil flow path 125 is filled with the motor cooling oil R2.

When the motor chamber internal oil flow path 125 is filled with the motor cooling oil R2, the stator 23 is immersed in the motor cooling oil R2 filled in the motor chamber internal oil flow path 125, and is cooled by the motor cooling oil R2.

The motor cooling oil R2 stored in the motor chamber internal oil flow path 125 is discharged from the oil discharge portion 127 according to the flow rate of the motor cooling oil R2 introduced from the oil introduction portion 126 into the motor chamber internal oil flow path 125.

In this way, the motor cooling oil R2 that fills the motor chamber internal oil flow path 125 is circulated, and the stator 23 is immersed in the motor cooling oil R2 filled in the motor chamber internal oil flow path 125 to be cooled.

At this time, the motor chamber internal oil flow path 125 is a sealed space inside the motor chamber 12. Therefore, due to the seal cover 24, the motor cooling oil R2 flowing through the axial flow paths 125A is not in contact with the rotor 22. A gap between the seal cover 24 and the outer peripheral surface of the rotor 22 forms an air layer without being filled with the motor cooling oil R2.

Since the viscosity resistance of the air is lower than that of the motor cooling oil R2, the existence of the air layer between the outer peripheral surface of the rotor 22 and the inner peripheral surface of the stator 23 can reduce the energy loss when the drive motor 20 is driven to rotate the rotor 22.

Figure 13:
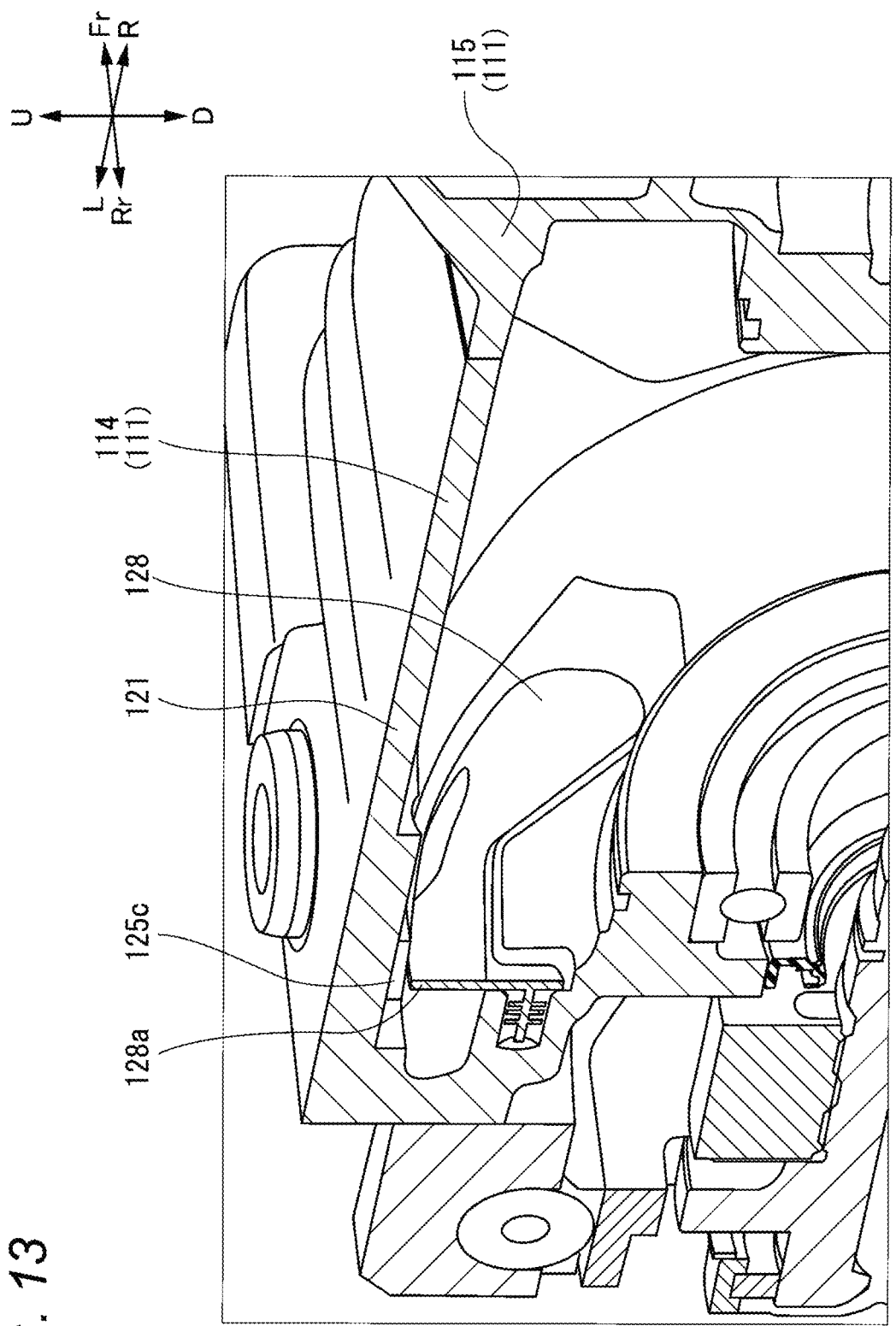
FIG. 13 is a perspective cross-sectional view of the vicinity of a separator in FIG. 12.
Figure 14:
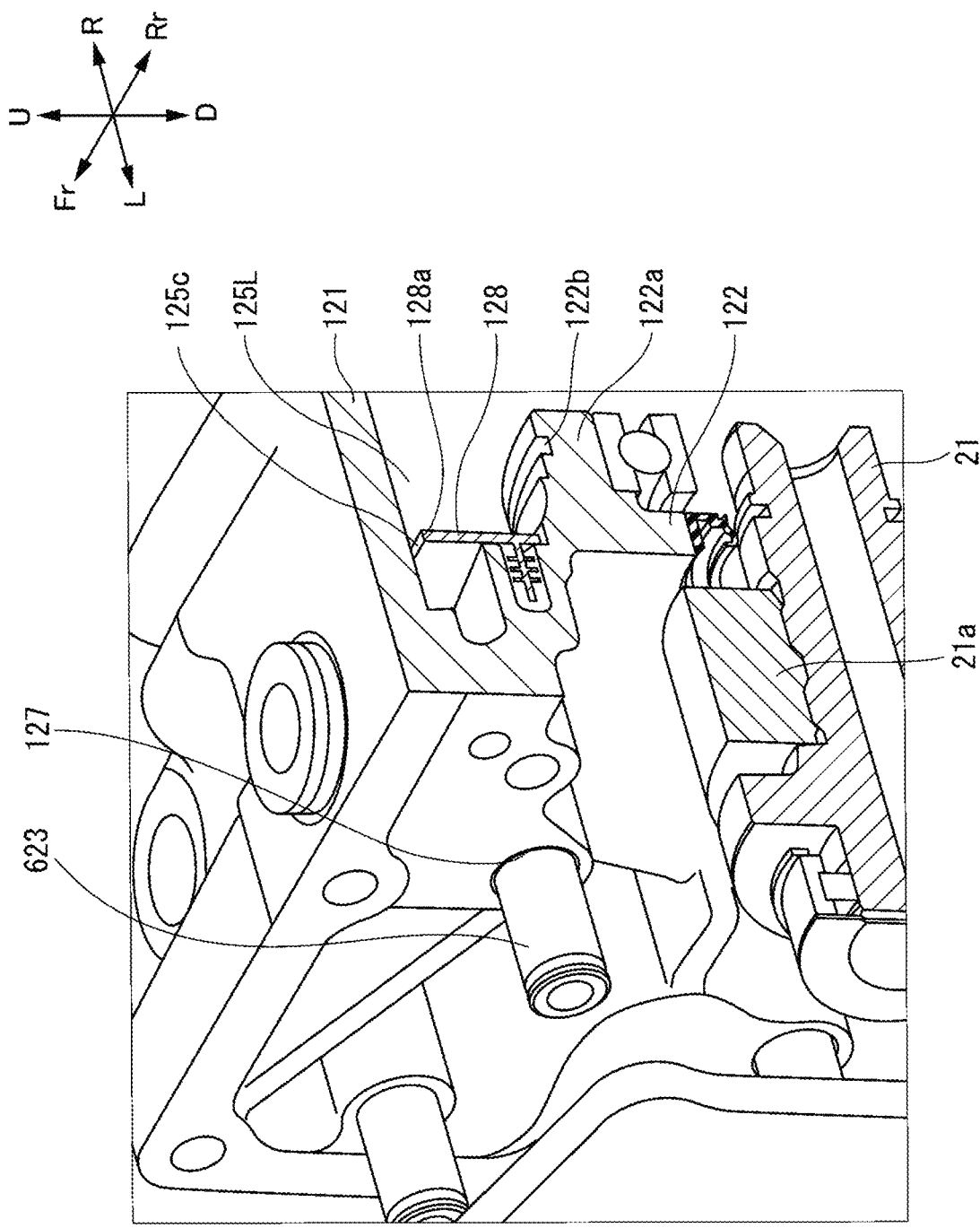
FIG. 14 is a perspective cross-sectional view of the vicinity of an oil discharge portion in FIG. 12.

As illustrated in FIGS. 12 to 14, between the oil discharge portion 127 and the stator 23 in the axial direction of the drive motor 20 in the upper portion inside the left annular flow path 125L, a position overlapping with the oil discharge portion 127 when viewed from the axial direction of the drive motor 20 is provided with a separator 128. The separator 128 extends in the upper-lower direction and divides the upper portion inside the left annular flow path 125L into a space on the left (closer to the oil discharge portion 127) and a space on the right (closer to the drive motor 20) in the axial direction of the drive motor 20.

A communication space 125c is formed between the upper end 128a of the separator 128 and the main case 111 of the drive unit case 11.

Therefore, the motor cooling oil R2 introduced from the oil introduction portion 126 into the motor chamber internal oil flow path 125 is stored in the space on the right (closer to the drive motor 20) in the upper portion inside the left annular flow path 125L.

When the liquid surface of the motor cooling oil R2 stored in the space to the right of the separator 128 (closer to the drive motor 20) exceeds the upper end 128a of the separator 128 at the upper portion inside the left annular flow path 125L, the motor cooling oil R2 flows from the communication space 125c into the space to the left of the separator 128 (closer to the oil discharge portion 127), and is discharged from the oil discharge portion 127 to the outside of the motor chamber internal oil flow path 125.

The separator 128 extends in the upper-lower direction such that the upper end 128a thereof is higher than the upper end of the coil 232 of the drive motor 20. The separator 128 extends in the upper-lower direction such that lower end of the communication space 125c formed between the upper end 128a of the separator 128 and the main case 111 of the drive unit case 11 is at a position where the upper end 128a is higher than the upper end of the coil 232 of the drive motor 20.

Therefore, in the motor chamber internal oil flow path 125, the motor cooling oil R2 is filled up to a position higher than the upper end of the coil 232 regardless of the position of the oil discharge portion 127. Accordingly, even if the oil discharge portion 127 is provided at a low position in the motor chamber internal oil flow path 125, the entire coil 232 can be reliably immersed in the motor cooling oil R2 to be cooled. Therefore, the oil discharge portion 127 can be provided in the left wall 122 of the motor chamber 12 and the upper-lower dimension of the drive unit 10 can be made compact, without lowering the cooling efficiency of the coil 232.

The oil discharge portion 127 is at least partially lower than the upper end 128a of the separator 128 in the upper-lower direction.

Accordingly, the motor cooling oil R2 flowing beyond the upper end 128a of the separator 128 into the space to the left of the separator 128 (closer to the oil discharge portion 127) from the communication space 125c can be more efficiently discharged to the outside of the motor chamber internal oil flow path 125.

The oil discharge portion 127 is provided in the left wall 122 of the motor chamber 12, whereas the oil introduction portion 126 is provided in the right wall 123 of the motor chamber 12. Therefore, the motor cooling oil R2 introduced from the oil introduction portion 126 into the motor chamber internal oil flow path 125 reliably flows in the axial direction from the right to the left of the drive motor 20. Accordingly, the motor cooling oil R2 can be reliably filled in the motor chamber internal oil flow path 125. Therefore, the entire coil 232 can be reliably immersed in the motor cooling oil R2 to be cooled.

The oil discharge portion 127 is provided at the upper portion of the motor chamber 12, whereas the oil introduction portion 126 is provided at the lower portion of the motor chamber 12. In this way, since the oil introduction portion 126 is provided at a position lower than the oil discharge portion 127, the motor cooling oil R2 introduced from the oil introduction portion 126 into the motor chamber internal oil flow path 125 reliably flows in the upper-lower direction from the lower side to the upper side of the drive motor 20. Accordingly, the motor cooling oil R2 can be reliably filled in the motor chamber internal oil flow path 125. Therefore, the entire coil 232 can be reliably immersed in the motor cooling oil R2 to be cooled.

As illustrated in FIGS. 14 to 17, the motor cooling oil R2 discharged from the oil discharge portion 127 is supplied to the oil cooler 63 through an oil cooler connecting pipe 623, which is provided in the drive unit case 11 and connects the oil discharge portion 127 of the motor chamber 12 and the oil cooler 63.

In the present embodiment, the chain chamber 14 is provided adjacent on the left to the motor chamber 12, and the storage portion 622 is provided adjacent on the left to the chain chamber 14. Further, the oil cooler 63 is provided adjacent on the left to the storage portion 622.

The left side cover 112 is provided with a partition wall 112a that partitions the chain chamber 14 and the storage portion 622. Therefore, the chain chamber 14 and the storage portion 622 are partitioned by the partition wall 112a.

The storage portion 622 is formed in the left side cover 112 in a manner open leftward. The drive unit case 11 further includes a storage portion cover 117 that closes the left side of the storage portion 622. The storage portion cover 117 is attached to the left side of the left side cover 112. The left side of the storage portion 622 is closed by the storage portion cover 117.

Therefore, the storage portion 622 is provided at a position adjacent to the chain chamber 14 and isolated from the motor chamber 12 with the chain chamber 14 interposed therebetween.

Accordingly, the storage portion 622 is isolated from the motor chamber 12 which is a heat source, and the chain chamber 14 is interposed between the storage portion 622 and the motor chamber 12. Therefore, it is possible to prevent the heat generated in the motor chamber 12 from being transferred to the storage portion 622, thereby maintaining the motor cooling oil R2 stored in the storage portion 622 at a low temperature.

The oil cooler 63 is attached to the left side surface of the storage portion cover 117.

In this way, the motor cooling oil R2 discharged from the oil discharge portion 127 of the motor chamber 12 is supplied to the oil cooler 63 through the oil cooler connecting pipe 623. Accordingly, the motor cooling oil R2 discharged from the oil discharge portion 127 can be supplied to the oil cooler 63 isolated from the motor chamber 12 with a simple configuration.

The storage portion cover 117 is formed with a through hole 117a that allows the motor cooling oil R2 discharged from the oil cooler 63 to flow.

The motor cooling oil R2 cooled by heat exchange with the cooling water R1 circulating in the first temperature control circuit 61 in the oil cooler 63 flows into the storage portion 622 through the through hole 117a to be stored in the storage portion 622.

Accordingly, a flow path connecting the oil cooler 63 and the storage portion 622 can be formed with a simple configuration.

The oil pump 621 for pressuring and feeding the motor cooling oil R2 is attached to the left side surface of the left side cover 112 (see FIG. 2). The oil pump 621 connects the oil introduction portion 126 of the motor chamber 12 via an oil supply flow path 624 formed in the drive unit case 11.

The oil pump 621 pressures and feeds the motor cooling oil R2 temporarily stored in the storage portion 622 to supply the motor cooling oil R2 to the motor chamber internal oil flow path 125 formed inside the motor chamber 12 through the oil supply flow path 624.

In this way, the oil pump 621 introduces the motor cooling oil R2 stored in the storage portion 622 provided at a position isolated from the motor chamber 12, which is the heat source, into the motor chamber 12 from the oil introduction portion 126 of the motor chamber 12. As a result, the motor cooling oil R2 at a lower temperature can be supplied to the motor chamber 12, thereby improving the cooling efficiency of the drive motor 20.

Furthermore, when viewed from the rotary shaft direction of the drive motor 20, the oil cooler connecting pipe 623, through which the R2 whose temperature rises after cooling the drive motor 20 flows, is formed in front of the rotary shaft of the drive motor 20. On the other hand, the oil supply flow path 624, through which the motor cooling oil R2 cooled in the oil cooler 63 flows, is formed behind the rotary shaft of the drive motor 20.

In this way, when viewed from the rotary shaft direction of the drive motor 20, the oil cooler connecting pipe 623 and the oil supply flow path 624 are isolated on one side and the other side facing each other, with the drive motor 20 interposed therebetween. Therefore, the motor cooling oil R2 flowing through the oil supply flow path 624 can be prevented from a temperature rise due to the motor cooling oil R2 flowing through the oil cooler connecting pipe 623.

The partition wall 112a is provided with a breather hole 112b that communicates the chain chamber 14 and the storage portion 622, at a position as being the upper portion of the storage portion 622.

When the pressure in the storage portion 622 exceeds a predetermined pressure, a gas containing the mist-like motor cooling oil R2 is discharged from the breather hole 112b to the chain chamber 14, and the pressure in the storage portion 622 is maintained at or below the predetermined pressure.

In this way, since the lubrication oil R3 has the same component as the motor cooling oil R2, the pressure in the storage portion 622 can be maintained at or below the predetermined pressure by using the breather path of the chain chamber 14 and gear chamber 13. Therefore, the breather path for the motor cooling oil R2 stored in the storage portion 622 and the breather path for the lubrication oil R3 for lubricating the speed reducer 30 and the power transmission chain 40 can be shared. This can downsize the drive unit 10.

As described above, the mist-like motor cooling oil R2 in the second temperature control circuit 62 may be discharged into the gear chamber 13 from the breather hole 112b, but the lubrication oil R3 is prevented from flowing into the second temperature control circuit 62.

Accordingly, the lubrication oil R3 is not mixed with the motor cooling oil R2, so that the lubrication oil R3, which tends to contain a large amount of sludge, can be prevented from being supplied to the drive motor 20.

(Lubrication and Cooling of Gear Chamber and Chain Chamber)

Figure 17:
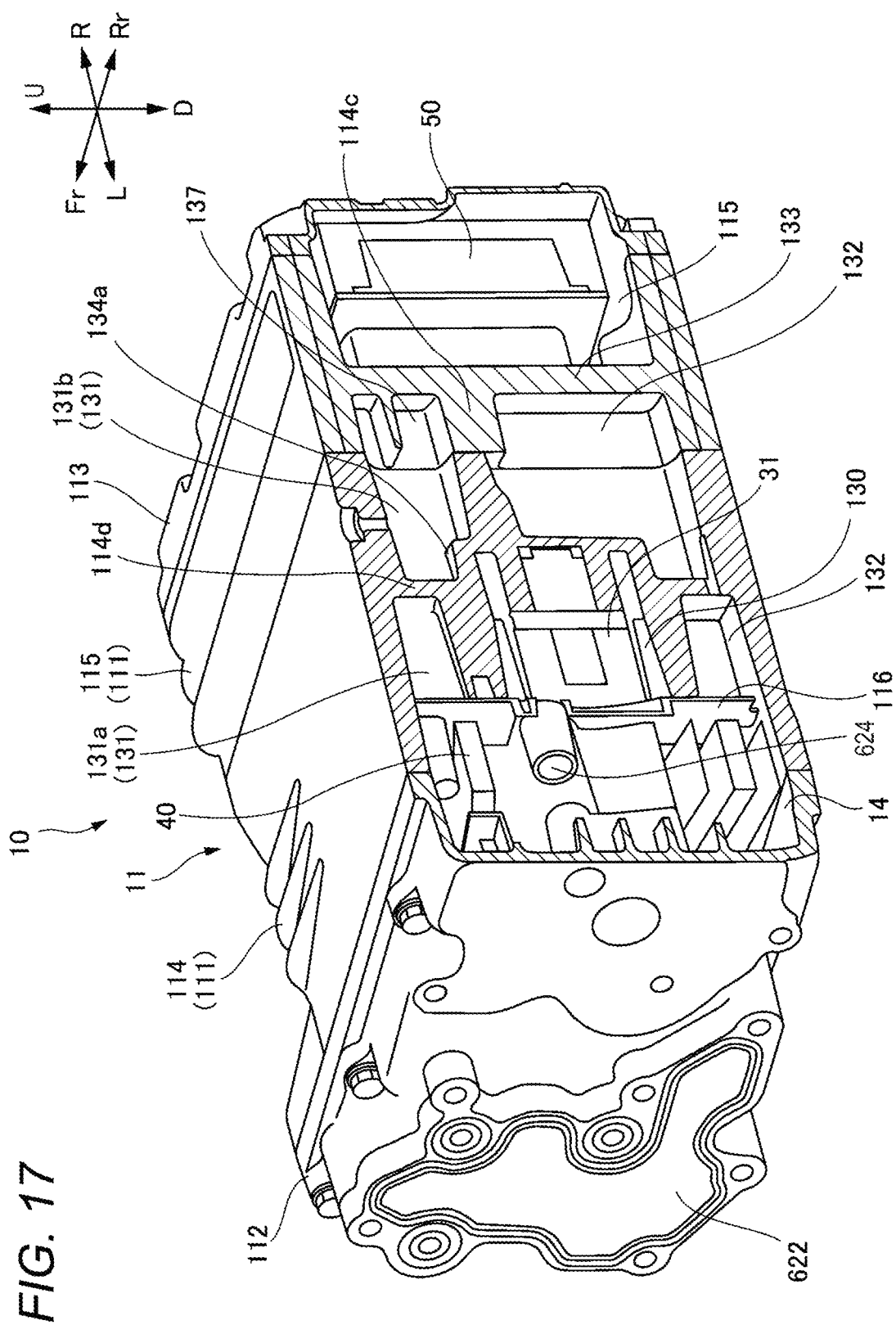
FIG. 17 is a perspective view of the drive unit in FIG. 2, with a part thereof cut out in the left-right direction.
Figure 18:
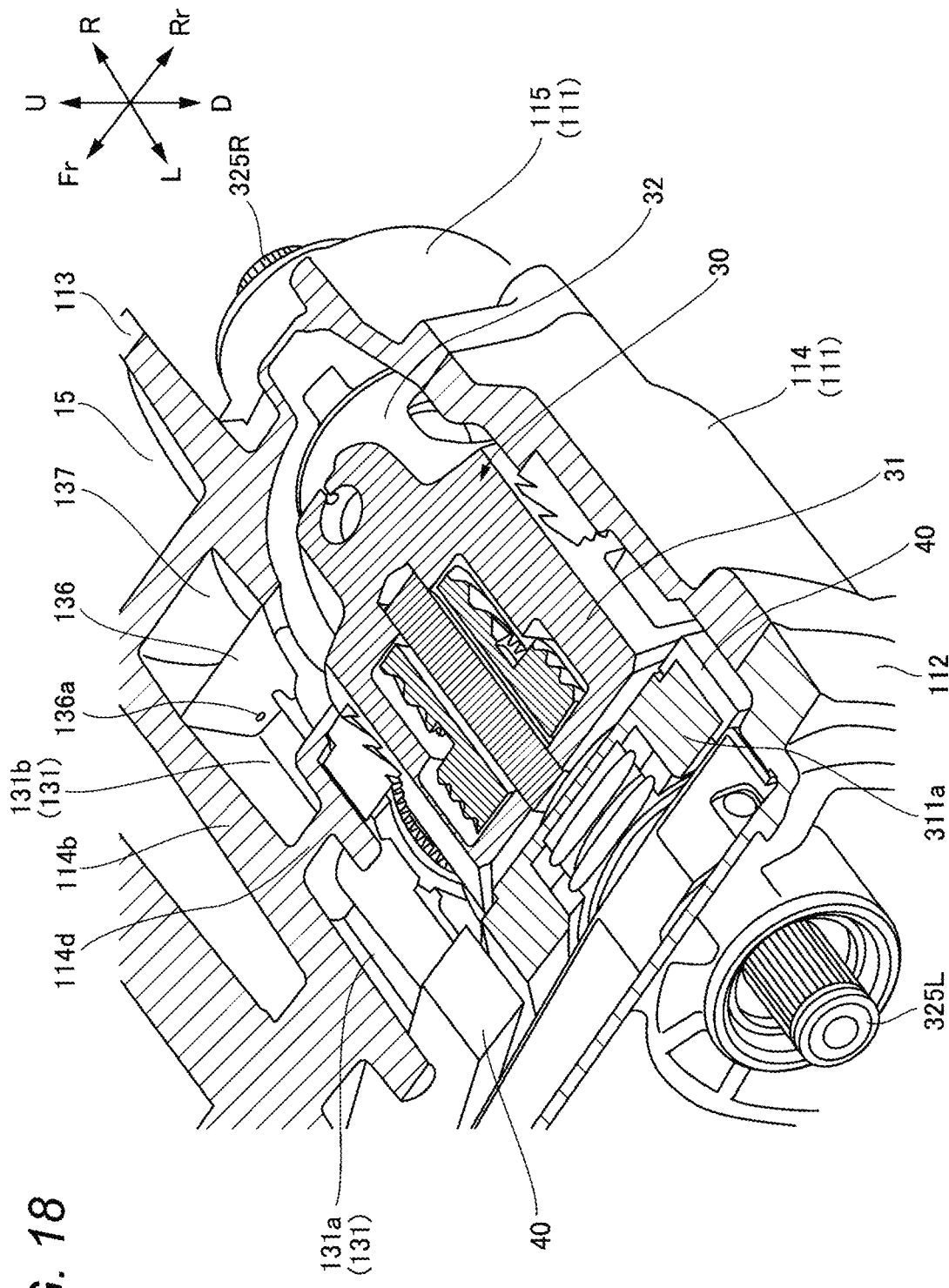
FIG. 18 is a perspective view of the drive unit in FIG. 2, with a part thereof cut out in the left-right direction.
Figure 19:
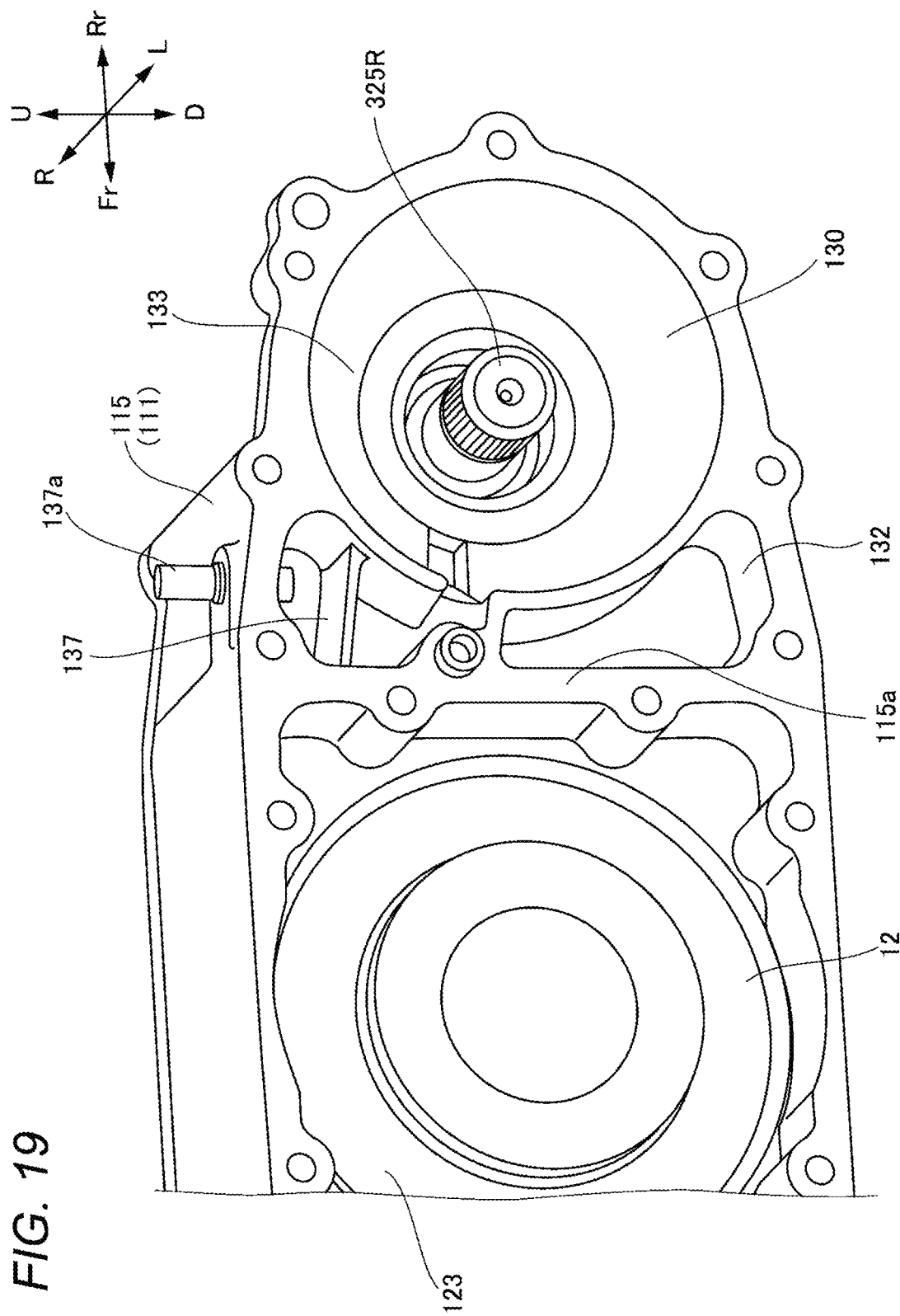
FIG. 19 is a perspective view of a right main case of the drive unit in FIG. 2.

As illustrated in FIGS. 17 to 19, in the chain chamber 14, the lower portion of the driven sprocket 311a is immersed in the lubrication oil R3 stored in the lower portion of the chain chamber 14. The, the lubrication oil R3 stored in the lower portion of the chain chamber 14 is scooped up by the driven sprocket 311a. The lubrication oil R3 scooped up by the driven sprocket 311a lubricates and cools the drive sprocket 21a, the driven sprocket 311a, the power transmission chain 40, and the like provided in the chain chamber 14.

Therefore, the scooping efficiency the driven sprocket 311a is improved as the height of the liquid surface of the lubrication oil R3 of the chain chamber 14 increases.

In the gear chamber 13, the lubrication oil R3 scooped up by the driven sprocket 311a in the chain chamber 14 is supplied from the hollow input shaft 311 to the gear chamber 13 through the inside of the hollow input shaft 311. The lubrication oil R3 supplied from the chain chamber 14 lubricates and cools the speed reducer 30.

Therefore, the speed reducer 30 can be sufficiently lubricated and cooled even if the amount of the lubrication oil R3 discharged from the hollow input shaft 311 is increased and the height of the liquid surface of the lubrication oil R3 in the gear chamber 13 is lowered. Therefore, if the amount of the lubrication oil R3 discharged from the hollow input shaft 311 is increased and the height of the liquid surface of the lubrication oil R3 in the gear chamber 13 is lowered, the stirring resistance when stirring the lubrication oil R3 by the rotation of the speed reducer 30 is reduced and the loss during the rotation of the speed reducer 30 is lowered.

In this way, the height of the liquid surface of the lubrication oil R3 of the chain chamber 14 is desirably high, and the height of the liquid surface of the lubrication oil R3 of the gear chamber 13 is desirably low.

The gear chamber 13 is formed with an accommodating chamber 130 that accommodates the planetary gear mechanism 31 and the differential gear mechanism 32. The accommodating chamber 130 has a substantially circular cross section as viewed from the rotary shaft direction of the planetary gear mechanism 31 and the differential gear mechanism 32. The lower portion of the accommodating chamber 130 stores a part of the lubrication oil R3 supplied from the chain chamber 14 to the gear chamber 13 through the inside of the input shaft 311. The lower portion of the planetary gear mechanism 31 and the lower portion of the differential gear mechanism 32 are immersed in the lubrication oil R3 stored in the lower portion of the accommodating chamber 130. The lubrication oil R3 stored in the lower portion of the accommodating chamber 130 is scooped up due to the rotation of the planetary gear mechanism 31 and the differential gear mechanism 32, which are also lubricated and cooled by the lubrication oil R3 scooped up due to the rotation of the planetary gear mechanism 31 and the differential gear mechanism 32.

In the present embodiment, as described above, in the left main case 114, the gear chamber 13 and the chain chamber 14 communicate with each other, whereas the left main case 114 is provided with the baffle plate 116 partitioning the gear chamber 13 and the chain chamber 14. The baffle plate 116 extends in the upper-lower direction and the front-rear direction between the driven sprocket 311a and the sun gear 312.

The baffle plate 116 extends upward from the bottom of the chain chamber 14 and the gear chamber 13, and limits the flow of the lubrication oil R3 between the chain chamber 14 and the gear chamber 13.

Accordingly, the height of the liquid surface of the lubrication oil R3 of the chain chamber 14 can be made different from the height of the liquid surface of the lubrication oil R3 of the gear chamber 13. The height of the liquid surface of the lubrication oil R3 of the chain chamber 14 can be made high, and the height of the liquid surface of the lubrication oil R3 of the gear chamber 13 can be made low. Accordingly, it is possible to reduce the stirring resistance of the lubrication oil R3 caused by the rotation of the speed reducer 30 while enhancing the lubrication performance in the gear chamber 13 and the chain chamber 14.

The upper portion of the gear chamber 13 is formed with an upper space 131. The upper space 131 is formed between the motor chamber 12 and the accommodating chamber 130 of the gear chamber 13. The upper space 131 is formed in the accommodating chamber 130 and communicates with the accommodating chamber 130. The upper space 131 is formed by the second dividing wall 114b.

The lower portion of the gear chamber 13 is formed with a lower space 132. The lower space 132 is partitioned to be separate from the accommodating chamber 130.

The lower space 132 is formed below the upper space 131. The lower space 132 is formed between the motor chamber 12 and the accommodating chamber 130 of the gear chamber 13. The upper space 131 and the lower space 132 are separated by an upper-lower dividing wall 114c extending rearward from the second dividing wall 114b.

The upper space 131 and the lower space 132 are formed between the motor chamber 12 and the accommodating chamber 130 of the gear chamber 13, and both store the lubrication oil R3.

Accordingly, the upper space 131 and the lower space 132 can be provided while limiting an increase in the upper-lower dimension of the drive unit case 11. By storing the lubrication oil R3 in the upper space 131 and the lower space 132, the height of the liquid surface of the lubrication oil R3 stored in the lower portion of the accommodating chamber 130 can be lowered. This can further reduce the stirring resistance of the lubrication oil R3 caused by the rotation of the speed reducer 30.

The upper space 131 extends in the axial direction of the output rotary shaft of the speed reducer 30, and is divided into a planetary-side upper storage portion 131a and a differential-side upper storage portion 131b in the axial direction of the output rotary shaft of the speed reducer 30.

In this way, since the upper space 131 is formed to be longer in the axial direction of the output rotary shaft of the speed reducer 30 and is divided into a plurality of spaces in the axial direction of the output rotary shaft of the speed reducer 30, it is possible to increase the time for the lubrication oil R3 to stay in the upper space 131. Accordingly, it is possible to prevent the lubrication oil R3 from foaming, and to lower the temperature of the lubrication oil R3.

The upper space 131, that is, the planetary-side upper storage portion 131a and the differential-side upper storage portion 131b are integrally formed by casting in the drive unit case 11 (the left main case 114 in the present embodiment).

The planetary-side upper storage portion 131a captures and stores a part of the lubrication oil R3 scooped up from the lower portion of the accommodating chamber 130 by the planetary gear mechanism 31 and scattered.

In addition, the planetary-side upper storage portion 131a captures and stores a part of the lubrication oil R3 discharged and scattered radially outward from the input shaft 311.

Accordingly, by the planetary-side upper storage portion 131a capturing the lubrication oil R3 discharged and scattered radially outward from the input shaft 311 and the lubrication oil R3 scooped up by the planetary gear mechanism 31 and scattered, the height of the liquid surface of the lubrication oil R3 stored in the lower portion of the accommodating chamber 130 can be further lowered. Therefore, the stirring resistance of the lubrication oil R3 due to the rotation of the speed reducer 30 can be further reduced. In this way, the dimension in the height direction of the drive unit 10 can be limited without lowering the power transmission efficiency.

The differential-side upper storage portion 131b captures and stores a part of the lubrication oil R3 scooped up by the differential gear mechanism 32 including the differential case 321 and scattered from the lubrication oil R3 stored in the lower portion of the gear chamber 13.

In addition, the differential-side upper storage portion 131b captures and stores a part of the lubrication oil R3 discharged from the right end of the input shaft 311 toward the differential gear mechanism 32 and scattered due to the rotation of the differential gear mechanism 32.

Accordingly, by the differential-side upper storage portion 131b capturing the lubrication oil R3 discharged from the right end of the input shaft 311 toward the differential gear mechanism 32 and scattered due to the rotation of the differential gear mechanism 32, and the lubrication oil R3 scooped up by the differential gear mechanism 32 including the differential case 321 and scattered from the lower portion of the accommodating chamber 130, the height of the liquid surface of the lubrication oil R3 stored in the lower portion of the accommodating chamber 130 can be further lowered. Therefore, the stirring resistance of the lubrication oil R3 due to the rotation of the speed reducer 30 can be further reduced.

In the left main case 114, the planetary-side upper storage portion 131a and the differential-side upper storage portion 131b are adjacent in the rotary shaft direction of the planetary gear mechanism 31 and the differential gear mechanism 32 with the upper dividing wall 114d interposed therebetween. The upper dividing wall 114d is provided with a first oil flow hole 134a that communicates the planetary-side upper storage portion 131a and the differential-side upper storage portion 131b and allows the lubrication oil R3 to flow through.

Accordingly, the lubrication oil R3 stored in the planetary-side upper storage portion 131a can flow to the differential-side upper storage portion 131b.

The left main case 114 and the right main case 115 are assembled with a gasket 136 sandwiched therebetween. The gasket 136 is a plate-shaped member extending in the upper-lower direction and the front-rear direction. The differential-side upper storage portion 131b is formed on the left side of the gasket 136, and the wall of the differential-side upper storage portion 131b is formed by the left main case 114 and the gasket 136. The gasket 136 forms at least a part of the right wall of the differential-side upper storage portion 131b. The right side of the gasket 136 is formed with a breather chamber 137 adjacent to the differential-side upper storage portion 131b with the gasket 136 interposed therebetween. The wall of the breather chamber 137 is formed by the right main case 115 and the gasket 136. The gasket 136 forms at least a part of the left wall of the breather chamber 137.

Accordingly, it is possible to form the wall of the differential-side upper storage portion 131b and the breather chamber 137 at a low cost while limiting the weight increase.

The gasket 136 is provided with a communication hole 136a that communicates the differential-side upper storage portion 131b and the breather chamber 137 and allows the gas and the mist of the lubrication oil R3 from the differential-side upper storage portion 131b and the breather chamber 137 to flow through.

Accordingly, it is possible to easily form the communication hole 136a that communicates the differential-side upper storage portion 131b and the breather chamber 137.

The upper portion of the breather chamber 137 is provided with a breather hole 137a communicating with the outside of the drive unit case 11. When the pressure in the gear chamber 13 exceeds the predetermined pressure, gas is released from the breather hole 137a, and the pressure in the gear chamber 13 is maintained at or below the predetermined pressure.

The upper space 131 communicates with the chain chamber 14. For example, the upper space 131 may communicate with the chain chamber 14 by not providing the baffle plate 116 in the upper portion of the upper space 131. Further, for example, the upper space 131 may be partitioned from the chain chamber 14 by the baffle plate 116, and the baffle plate 116 may be provided with a communication hole communicating the upper space 131 and the chain chamber 14.

Therefore, if the pressure in the chain chamber 14 increases, the gas in the chain chamber 14 including the mist-like lubrication oil R3 flows into the upper space 131. The gas in the gear chamber 13 including the mist-like lubrication oil R3 flows into the breather chamber 137 through the upper space 131. When the pressure in the gear chamber 13 exceeds the predetermined pressure, the gas is released from the breather hole 137a. Accordingly, the pressures in both the chain chamber 14 and the gear chamber 13 are maintained at or below the predetermined pressure.

Further, when the pressure in the storage portion 622 exceeds the predetermined pressure, the gas containing the mist-like motor cooling oil R2 discharged from the breather hole 112b to the chain chamber 14 flows from the chain chamber 14 to the breather chamber 137 through the upper space 131, together with the gas containing the mist-like lubrication oil R3 in the chain chamber 14. When the pressure in the gear chamber 13 exceeds the predetermined pressure, the gas is released from the breather hole 137a.

Accordingly, by using the breather chamber 137 and the breather hole 137a of the lubrication oil R3 for lubricating the speed reducer 30 and the power transmission chain 40, to maintain the storage portion 622 at or below the predetermined pressure, it is not necessary to separately provide a breather chamber and a breather hole for maintaining the storage portion 622 at or below the predetermined pressure. This can downsize the drive unit 10.

Further, since the storage portion 622 is provided at a position isolated from the motor chamber 12 with the chain chamber 14 interposed therebetween, the storage portion 622 can be provided at a position isolated from the motor chamber 12 without increasing the size of the drive unit 10. In addition, by providing the breather chamber 137 at a position adjacent to the accommodating chamber 130 and the motor chamber 12, the dead space generated between the accommodating chamber 130 and the motor chamber 12 can be effectively utilized to provide the breather chamber 137. This can downsize the drive unit 10.

Moreover, since the storage portion 622 can be configured so as not to directly communicate with the outside of the drive unit 10, it is possible to prevent foreign matters and moisture from mixing into the second temperature control circuit 62 from the outside of the drive unit 10.

Although an embodiment of the present disclosure has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the components in the above embodiment may be freely combined without departing from the gist of the invention.

For example, in the present embodiment, the breather chamber 137 and the breather hole 137a are provided in the right main case 115, but may be provided in the left main case 114. In this case, the breather chamber 137 may be provided instead of the differential-side upper storage portion 131b.

Further, in the present embodiment, the breather chamber 137 and the breather hole 137a are provided adjacent to the gear chamber 13, but may be provided adjacent to the chain chamber 14.

In the present description, at least the following matters are described. In the parentheses, corresponding components and the like in the above embodiment are illustrated as an example, but the present invention is not limited thereto.

(1) A drive unit (drive unit 10) including:
  a drive motor (drive motor 20);
  a drive unit case (drive unit case 11) having a motor chamber (motor chamber 12) in which the drive motor is accommodated;
  a heat exchanger (oil cooler 63) configured to cool a cooling fluid (motor cooling oil R2) for cooling the drive motor; and
  a storage portion (storage portion 622) configured to store the cooling fluid, in which the drive unit case is formed with a buffer chamber (chain chamber 14) separated from the motor chamber and adjacent to the motor chamber, the buffer chamber being divided from the motor chamber by a dividing wall (first dividing wall 114a), and the storage portion is provided at a position isolated from the motor chamber with the buffer chamber interposed therebetween.

According to (1), the storage portion is isolated from the motor chamber, which is a heat source, and the buffer chamber is interposed between the storage portion and the motor chamber. Therefore, it is possible to prevent the heat generated in the motor chamber from being transferred to the storage portion, thereby maintaining the cooling fluid stored in the storage portion at a low temperature.

(2) The drive unit according to (1),
  in which the drive unit is provided with a cooling fluid connecting pipe (oil cooler connecting pipe 623) configured to connect the motor chamber and the heat exchanger, and
  the cooling fluid discharged from the motor chamber is supplied to the heat exchanger through the cooling fluid connecting pipe.

According to (2), the cooling fluid discharged from the motor chamber is supplied to the heat exchanger through the cooling fluid connecting pipe. Accordingly, the cooling fluid discharged from the motor chamber can be supplied to the heat exchanger isolated from the motor chamber with a simple configuration.

(3) The drive unit according to (1),
  in which the drive unit case is provided with a communication hole (communication hole 136a) configured to communicate the heat exchanger and the storage portion, and the cooling fluid supplied to the heat exchanger and cooled in the heat exchanger flows into the storage portion through the communication hole to be stored in the storage portion.

According to (3), a flow path connecting the heat exchanger and the storage portion can be formed with a simple configuration.

(4) The drive unit according to (1),
  in which the motor chamber is provided with a cooling fluid introduction portion (oil introduction portion 126) configured to introduce the cooling fluid into the motor chamber,
  the drive unit further includes:
    a cooling fluid pump (oil pump 621) configured to pressure and feed the cooling fluid; and
    a cooling fluid supply flow path (oil supply flow path 624) configured to connect the cooling fluid pump and the cooling fluid introduction portion of the motor chamber, and
  the cooling fluid pump pressures and feeds the cooling fluid stored in the storage portion to supply the cooling fluid into the motor chamber through the cooling fluid supply flow path.

According to (4), the cooling fluid pump pressures and feeds the cooling fluid stored in the storage portion provided at a position isolated from the motor chamber, which is the heat source, and introduces the cooling fluid into the motor chamber from the cooling fluid introduction portion of the motor chamber. As a result, the cooling fluid at a lower temperature can be supplied to the motor chamber, thereby improving the cooling efficiency of the drive motor.

(5) The drive unit according to (4),
  in which the drive unit is provided with a cooling fluid connecting pipe (oil cooler connecting pipe 623) configured to connect the motor chamber and the heat exchanger,
  the cooling fluid discharged from the motor chamber is supplied to the heat exchanger through the cooling fluid connecting pipe, and
  the cooling fluid connecting pipe and the cooling fluid supply flow path are isolated on one side and an other side facing each other with the drive motor interposed therebetween.

According to (5), since the cooling fluid connecting pipe and the cooling fluid supply flow path are isolated on one side and the other side facing each other with the drive motor interposed therebetween, the temperature of the cooling fluid flowing through the cooling fluid supply flow path can be prevented from rising due to the cooling fluid flowing through the cooling fluid connecting pipe.

(6) The drive unit according to any one of (1) to (5),
  in which a partition wall (partition wall 112a), which partitions the storage portion and the buffer chamber, is provided with a storage portion breather hole (breather hole 112b) configured to communicate the buffer chamber and the storage portion, at a position as being an upper portion of the storage portion.

According to (6), when the pressure in the storage portion exceeds a predetermined pressure, a gas containing the mist-like cooling fluid is discharged from the storage portion breather hole to the buffer chamber, and the pressure in the storage portion is maintained at or below the predetermined pressure.

(7) The drive unit according to (6),
in which the drive unit further includes:
a speed reducer (speed reducer 30) configured to output power output from the drive motor to an outside at a reduced speed; and
a power transmission member (power transmission chain 40) configured to transmit the power output from the drive motor to the speed reducer,
the speed reducer and the power transmission member are lubricated by a lubrication fluid (lubrication oil R3), and
the cooling fluid and the lubrication fluid have a same component.

According to (7), since the lubrication fluid and the cooling fluid have the same component, the pressure in the storage portion can be maintained at or below the predetermined pressure by using the breather path of the lubrication fluid for lubricating the speed reducer and the power transmission member. Therefore, the breather path for the cooling fluid stored in the storage portion and the breather path for the lubrication fluid for lubricating the speed reducer and the power transmission member can be shared. This can downsize the drive unit.

(8) The drive unit according to (7),
in which the drive unit case further includes
an accommodating chamber (accommodating chamber 130) in which the speed reducer is accommodated, and
a breather chamber (breather chamber 137) adjacent to the accommodating chamber and the motor chamber,
the buffer chamber is a power transmission member accommodating chamber (chain chamber 14) that accommodates the power transmission member, and
the breather chamber is provided with a breather hole (breather hole 137a) configured to communicate with an outside of the drive unit case.

According to (8), by using the breather hole and the breather chamber of the lubrication fluid for lubricating the speed reducer and the power transmission member to maintain the storage portion at or below the predetermined pressure, it is not necessary to separately provide a breather chamber and a breather hole for maintaining the storage portion at or below the predetermined pressure. This can downsize the drive unit.

Further, since the storage portion is provided at a position isolated from the motor chamber with the power transmission member accommodating chamber interposed therebetween, the storage portion can be provided at a position isolated from the motor chamber without increasing the size of the drive unit. In addition, by providing the breather chamber at a position adjacent to the accommodating chamber and the motor chamber, the dead space generated between the accommodating chamber and the motor chamber can be effectively utilized to provide the breather chamber. This can downsize the drive unit.

Moreover, since the storage portion can be configured so as not to directly communicate with the outside of the drive unit, it is possible to prevent foreign matters and moisture from mixing into the temperature control circuit for temperature control of the drive motor from the outside of the drive unit.

What is claimed is:
1. A drive unit comprising:
a drive motor;
a drive unit case having a motor chamber in which the drive motor is accommodated;
a heat exchanger configured to cool a cooling fluid for cooling the drive motor; and
a storage portion configured to store the cooling fluid,
wherein the drive unit case is formed with a buffer chamber separated from the motor chamber and adjacent to the motor chamber, the buffer chamber being divided from the motor chamber by a dividing wall, and
the storage portion is provided at a position isolated from the motor chamber with the buffer chamber interposed therebetween.

2. The drive unit according to claim 1,
wherein the drive unit is provided with a cooling fluid connecting pipe configured to connect the motor chamber and the heat exchanger, and
the cooling fluid discharged from the motor chamber is supplied to the heat exchanger through the cooling fluid connecting pipe.

3. The drive unit according to claim 1,
wherein the drive unit case is provided with a communication hole configured to communicate the heat exchanger and the storage portion, and
the cooling fluid supplied to the heat exchanger and cooled in the heat exchanger flows into the storage portion through the communication hole to be stored in the storage portion.

4. The drive unit according to claim 1,
wherein the motor chamber is provided with a cooling fluid introduction portion configured to introduce the cooling fluid into the motor chamber,
the drive unit further comprises:
a cooling fluid pump configured to pressure and feed the cooling fluid; and
a cooling fluid supply flow path configured to connect the cooling fluid pump and the cooling fluid introduction portion of the motor chamber, and
the cooling fluid pump pressures and feeds the cooling fluid stored in the storage portion to supply the cooling fluid into the motor chamber through the cooling fluid supply flow path.

5. The drive unit according to claim 4,
wherein the drive unit is provided with a cooling fluid connecting pipe configured to connect the motor chamber and the heat exchanger,
the cooling fluid discharged from the motor chamber is supplied to the heat exchanger through the cooling fluid connecting pipe, and
the cooling fluid connecting pipe and the cooling fluid supply flow path are isolated on one side and an other side facing each other with the drive motor interposed therebetween.

6. The drive unit according to claim 1,
wherein a partition wall, which partitions the storage portion and the buffer chamber, is provided with a storage portion breather hole configured to communicate the buffer chamber and the storage portion, at a position as being an upper portion of the storage portion.

7. The drive unit according to claim 6,
wherein the drive unit further comprises:
a speed reducer configured to output power output from the drive motor to an outside at a reduced speed; and
a power transmission member configured to transmit the power output from the drive motor to the speed reducer, the speed reducer and the power transmission member are lubricated by a lubrication fluid, and
the cooling fluid and the lubrication fluid have a same component.

8. The drive unit according to claim 7,
wherein the drive unit case further comprises:
an accommodating chamber in which the speed reducer is accommodated, and
a breather chamber adjacent to the accommodating chamber and the motor chamber,
the buffer chamber is a power transmission member accommodating chamber that accommodates the power transmission member, and
the breather chamber is provided with a breather hole configured to communicate with an outside of the drive unit case.

\* \* \* \* \*

UNITED STATES PATENT AND TRADEMARK OFFICE
CERTIFICATE OF CORRECTION

PATENT NO. : 12,463,504 B2  
APPLICATION NO. : 18/794382  
DATED : November 4, 2025  
INVENTOR(S) : Takashi Wakui et al.

Page 1 of 1

It is certified that error appears in the above-identified patent and that said Letters Patent is hereby corrected as shown below:

On the Title Page

Item (30) Foreign Application Priority Data  
Aug. 7, 2023 (JP) ............................................2023-128804 should be added.

Signed and Sealed this  
Twenty-seventh Day of January, 2026

John A. Squires  
*Director of the United States Patent and Trademark Office*